US007018786B2

(12) United States Patent
Geuens et al.

(10) Patent No.: US 7,018,786 B2
(45) Date of Patent: Mar. 28, 2006

(54) TONING AGENTS FOR USE IN THERMOGRAPHIC RECORDING MATERIALS

(75) Inventors: Ingrid Geuens, Emblem (BE); Johan Loccufier, Zwijnaarde (BE); Vera Drieghe, Kontich (BE)

(73) Assignee: AGFA Gevaert, Mortsel (BE)

( * ) Notice: Subject to any disclaimer, the term of this patent is extended or adjusted under 35 U.S.C. 154(b) by 0 days.

(21) Appl. No.: 10/737,495

(22) Filed: Dec. 16, 2003

(65) Prior Publication Data

US 2004/0152027 A1 Aug. 5, 2004

Related U.S. Application Data

(60) Provisional application No. 60/440,429, filed on Jan. 16, 2003.

(30) Foreign Application Priority Data

Dec. 19, 2002 (EP) .................................. 02102832

(51) Int. Cl.

*C03C 1/35* (2006.01)
*C03C 1/494* (2006.01)
*C03C 1/498* (2006.01)
*C03C 5/29* (2006.01)

(52) U.S. Cl. ...................... 430/353; 430/618; 430/619; 430/965; 430/964

(58) Field of Classification Search ................ 430/233, 430/617, 618, 619, 964, 965, 353
See application file for complete search history.

(56) References Cited

U.S. PATENT DOCUMENTS

| | | | |
|---|---|---|---|
| 3,080,254 A | 3/1963 | Grant Jr. | |
| 3,885,967 A | 5/1975 | Sashihara et al. | |
| 3,893,860 A | 7/1975 | Sutton et al. | |
| 3,951,660 A | 4/1976 | Hagemann et al. | |
| 4,624,911 A * | 11/1986 | Idota et al. | 430/251 |
| 5,599,647 A * | 2/1997 | Defieuw et al. | 430/200 |
| 6,479,227 B1 | 11/2002 | Kubo et al. | |

FOREIGN PATENT DOCUMENTS

| | | |
|---|---|---|
| EP | 0 752 616 A1 | 1/1997 |
| EP | 0 921 433 A1 | 6/1999 |
| EP | 1 191 394 A2 | 3/2002 |
| JP | 11 202444 A | 7/1999 |
| WO | WO 96/10213 A1 | 4/1996 |

OTHER PUBLICATIONS

Brinckman et al.; *Unconventional Imaging Processes*, London & New York, The Focal Press, pp. 74-75 (1978).

Sturge et al. (eds.); *Imaging Processes and Materials*, Neblette's Eighth Ed., New York: Van Nostrand Reinhold, Chapter 9 (1989).

Zou et al.; *J. Imaging Science and Technol.*, 40(2), 94-103, (Mar./Apr. 1996).

Search Report for EP 02 10 2832 (Jun. 3, 2003).

* cited by examiner

*Primary Examiner*—Richard L. Schilling
(74) *Attorney, Agent, or Firm*—Leydig, Voit & Mayer, Ltd.

(57) ABSTRACT

A black and white monosheet thermographic recording material comprising a support and a thermosensitive element, the thermosensitive element containing a substantially light-insensitive organic silver salt, an organic reducing agent therefor in thermal working relationship therewith, a binder and at least one toning agent, wherein the at least one toning agent is represented by formula (I):

(I)

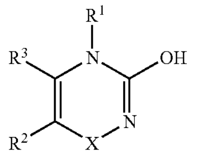

wherein $R^1$ is a hydrogen atom or an alkyl, an alkenyl, an alkynyl, a cycloalkyl, an alkaryl, an aryl, a heterocyclic or a heteroaryl group all of which may be optionally substituted; with the proviso that $R^1$ may not be a hydrogen atom if both $R^2$ and $R^3$ are both hydrogen atoms; $R^2$ and $R^3$ are independently a hydrogen or a halogen atom or an amino, amide, ester, carboxy, carbonate, alkyl, alkenyl, alkynyl, cycloalkyl, alkaryl, aryl, heterocyclic or heteroaryl group all of which may be optionally substituted; $R^2$ and $R^3$ may together represent the atoms necessary to complete a heteroaromatic ring with no more than one nitrogen atom, an alicyclic or a heterocyclic group which all may be optionally substituted; and X is a carbonyl group, or is —N—$R^4$, where $R^4$ is an alkyl group.

19 Claims, No Drawings

TONING AGENTS FOR USE IN THERMOGRAPHIC RECORDING MATERIALS

CROSS-REFERENCE TO RELATED PATENT APPLICATIONS

This application claims the benefit of U.S. Provisional Application No. 60/440,429 filed Jan. 16, 2003, which is incorporated by reference. In addition, this application claims the benefit of European Application No. 02102832.9 filed Dec. 19, 2002, which is also incorporated by reference.

FIELD OF THE INVENTION

The present invention concerns toning agents for use in thermographic recording materials.

BACKGROUND OF THE INVENTION

Thermography is an image-forming process including a heating step and hence includes photothermography in which the image-forming process includes image-wise exposure and direct thermal processes in which the image-forming process includes an image-wise heating step. In direct thermal printing a visible image pattern is produced by image-wise heating of a recording material.

U.S. Pat. No. 3,080,254 discloses a typical heat-sensitive copy paper including in the heat-sensitive layer a thermoplastic binder, e.g ethyl cellulose, a water-insoluble silver salt, e.g. silver stearate and an appropriate organic reductor, of which 4-methoxy-1-hydroxy-dihydronaphthalene is a representative. Localized heating of the sheet in the thermographic reproduction process, or for test purposes by momentary contact with a metal test bar heated to a suitable conversion temperature in the range of about 90–150° C., causes a visible change to occur in the heat-sensitive layer. The initially white or lightly coloured layer is darkened to a brownish appearance at the heated area. In order to obtain a more neutral colour tone a heterocyclic organic toning agent such as phthalazinone is added to the composition of the heat-sensitive layer. Example 2 discloses the use of barbituric acid in heat-sensitive copy sheet to improve the image tone.

WO 96/010213 discloses a thermographic imaging element comprising a substrate having coated on at least one surface thereof a thermographic imaging system comprising at least one layer comprising light-insensitive organic silver salt; reducing agent for silver ion; binder; toner; and a dye which absorbs radiation in the wavelength range of 750–1100 n, wherein said at least one layer comprising said light-insensitive organic silver salt forms an image density greater than about 1.0 when exposed to 0.10 to 2.0 joules/$cm^2$ of said radiation in 0.20 to 200 microseconds. The thermographic imaging system of Examples 2, 3, 5 and 6 contained barbituric acid in association with known toning agents such as phthalazinone and succinimide.

U.S. Pat. No. 3,893,860 discloses in a photothermographic element comprising a support having thereon (I): (a) photographic silver halide in association with (b) a silver salt of a heterocyclic thione, said heterocyclic thione being represented by the formula:

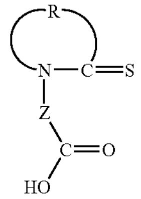

wherein R represents atoms completing a 5-member heterocyclic nucleus and Z is alkylene containing 1 to 30 carbon atoms, (c) an organic reducing agent for said silver salt of a heterocyclic thione, and (d) a polymeric, synthetic binder and contiguous to (I), at least one polymer layer (II), the improvement wherein said polymer (A) comprising at least 50% by weight of a polymer (A) comprising the repeating units represented by the formulas:

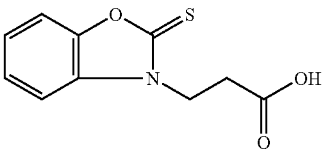

wherein: $R^1$ is hydrogen or alkyl containing 1 to 4 carbon atoms; $R^2$ is an imidazoyl, N-substituted carbamoyl, 2-pyrrolidinyl, acetoacetoxyethoxycarbonyl, acetoacetonylmethylphenyl, ethoxycarbonylaceto, pyridyl, hydroxy, hydroxalkyl containing 1 to 4 carbon atoms, carboxy, carboxyethoxycarbonyl, a heterocyclic ammonium salt group having a 5- or 6-membered azonia nitrogen-containing ring, or a pyridinium salt group, and the weight ratio of starting monomers for said units B and C is, respectively, about 60:40 to 100:0. U.S. Pat. No. 3,893,860 also discloses the use of 2,4-dimercaptopyrimidine as a toning agent for use in photothermographic elements disclosed therein.

EP-A 0 921 433 discloses a thermographic recording element having at least one image forming layer and comprising an organic silver salt, an reducing agent, and at least one of compounds of the following formulas (A) and (B):

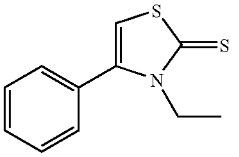

wherein $Z_1$ and $Z_2$ each are a group of non-metallic atoms capable of forming a 5- to 7-membered ring structure with the carbon atoms, $Y_1$ and $Y_2$ each as —C(=O)— or —$SO_2$—, $X_1$ and $X_2$ each ar a hydroxy or salt thereof, alkoxy, aryloxy, heterocyclic oxy, mercapto or salt thereof, alkylthio, arylthio, heterocyclic thio, amino, alkylamino, is arylamino, heterocyclic amino, acylamino, sulfonamide or heterocyclic group, and $Y_3$ is hydrogen or a substituent. EP-A 0 921 433 also discloses the use of pyrimidine and asymmetric triazines such as 2,4-dihydroxypyrimidine (uracil), 2-hydroxy-4-amino-pyrimidine and azauracil in the thermographic recording element disclosed therein.

U.S. Pat. No. 6,479,227 discloses a thermographic recording element comprising: a support having a pair of opposed surfaces, at least one antistatic layer containing conductive metal oxide particles and at least one thermographic recording layer containing an organic silver salt and a reducing agent on the first surface of the support, and at least two layers on the other surface of the support, wherein the outermost layer of said at least two layers contains a hydrophobic polymer binder and at least one layer of said at least two layers other than said outermost layer contains a matte agent, wherein: said conductive metal oxide particles are acicular particles having a major axis to minor axis ratio of from 3/1 to 50/1, and said thermographic recording element further comprises a nucleating agent. U.S. Pat. No. 6,479,227 also discloses the use of 2,4-dimercaptopyrimidine, pyrimidine and asymmetric triazines such as 2,4-dihydroxypyrimidine (uracil), 2-hydroxy-4-amino-pyrimidine, azauracil, 4-hydroxy-2-mercaptopyrimidine, 2-mercaptopyrimidine, 4,6-diamino-2-mercaptopryimidine, and 2-mercapto-4-methylpyrimidine hydrochloride in the thermographic recording element disclosed therein.

U.S. Pat. No. 3,951,660 discloses a photographic radiation sensitive recording material having therein a radiation sensitive composition and at least one layer containing dispersed in a binding agent a substantially non-light sensitive silver salt, a reducing agent for the non-light sensitive silver salt, and a toner compound, the improvement which comprises the toner being a heterocyclic toner compound of the following formula:

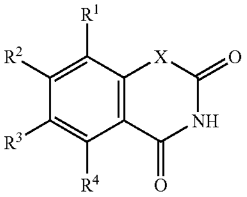

in which X represents O or N—$R^5$; $R^1$, $R^2$, $R^3$ or $R^4$ represent hydrogen, alkyl, cycloalkyl, alkoxy, alkylthio, hydroxy, dialkylamino or halogen, in addition to which $R^1$ and $R^2$ or $R^2$ and $R^3$ or $R^3$ and $R^4$ can represent the ring members required to complete an anellated aromatic ring, and $R^5$ represents alkyl. U.S. Pat. No. 3,951,660 discloses 2,4 (1H,3H)-quinazolinedione and various 2,4 (1H,3H)-quinazolinedione (benzoyleneurea) derivatives substituted at the nitrogen atom in the 1-position i.e. 2-hydroxy-pyrimidine derivatives annelated at the 5,6 positions with a benzene ring:

| Compound nr. | | |
|---|---|---|
| 1 | 1-methyl-2,4(1H,3H)-quinazolinedione | 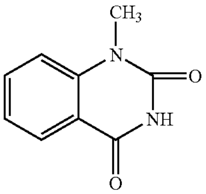 |

-continued

| Compound nr. | | |
|---|---|---|
| 2 | 1,7-dimethyl-2,4(1H, 3H)-quinazolinedione | 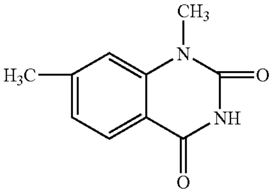 |
| 3 | 1-ethyl-2,4(1H,3H)-quinazolinedione | 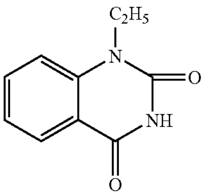 |
| 4 | 1-butyl-2,4(1H,3H)-quinazolinedione | 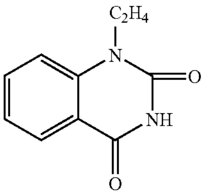 |
| 5 | 1-butyl-8-methyl-2,4 (1H,3H)-quinazolinedione | 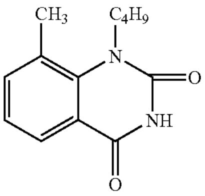 |
| 8 | 1-butyl-7-methyl-2,4 (1H,3H)-quinazolinedione | 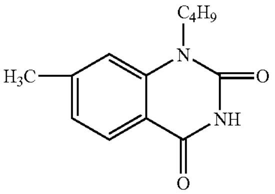 |
| 26 | 2,4 (1H,3H)-quinazolinedione | 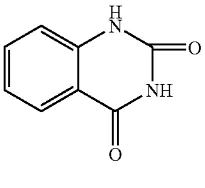 |
| 38 | 1-isobutyl-2,4(1H,3H)-quinazolinedione | 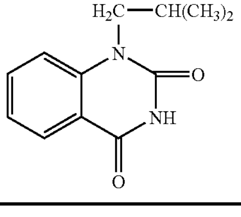 |

INVENTION EXAMPLES are disclosed in U.S. Pat. No. 3,951,660 in which the use of compounds 1, 3 and 26 as toning agents in thermographic recording materials is exemplified.

U.S. Pat. No. 3,885,967 discloses a photosensitive material for a thermally developable lightsensitive element which comprises: a) a silver salt component comprising silver laurate or silver caprate, b) a catalytic amount of a photosensitive silver halide component comprising a photosensitive silver halide, or a compound which reacts with silver laurate or silver caprate to form a photosensitive silver halide, c) a reducing agent, d) a binder, and e) a toning agent comprising a compound represented by the formula:

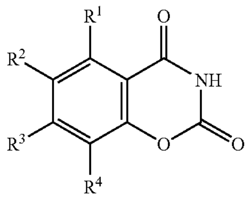

wherein $R^1$, $R^2$, $R^3$ and $R^4$ each represents a hydrogen atom, an alkyl group, an aryl group, an acylamido group, a halogen atom, a hydroxyl group or a nitro group.

EP-A 0 752 6-16 discloses a thermographic material comprising at least one element and wherein said element(s) contain(s) therein a substantially light-insensitive organic heavy metal salt and an organic reductor therefor, the said material being capable of thermally producing an image from said organic heavy metal salt and reductor, wherein said material contains a 1,3-benzoxazine-2,4-dione toning agent having general formula (I):

(I)

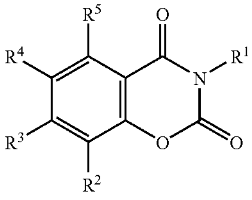

wherein $R^1$ represents hydrogen, —$CH_2OH$, —(C═O)—R, —CONHR, or M; $R^2$, $R^3$, $R^4$ and $R^5$ each independently represents hydrogen, —O—(C═O)—OR or —NH—(C═O)—OR and at least one of which is not hydrogen if $R^1$ is also hydrogen; R represents an alkyl or aryl group either of which may be substituted; and M represents a monovalent heavy metal ion.

Differences Between Thermography and Photography

The imaging arts have long recognized that the field of thermography comprising both photothermography and substantially light-insensitive thermography are clearly distinct from that of photography. Photothermographic and substantially light-insensitive thermographic materials differ significantly from conventional silver halide photographic materials which require processing using aqueous processing solutions.

In photothermographic and substantially light-insensitive thermographic imaging materials, a visible image is created by heat as a result of the reaction of a developer incorporated within the element. Heat at 50° C. or more is essential for this development process and temperatures of over 100° C. are routinely required for photothermographic materials and still higher temperatures are routinely required for substantially light-insensitive thermographic materials. In contrast, conventional wet-processed photographic imaging elements require processing in aqueous processing baths to provide a visible image (e.g., developing and fixing baths) and development is usually performed at more moderate temperatures (e.g., 30° to 50° C.) to provide a visible image.

In photothermographic elements only a small amount of silver halide is used to capture light and a different sort of silver (e.g., silver behenate) is used to generate the image with heat. Thus imaged, the silver halide serves as a catalyst for the physical development process involving the non-photosensitive, reducible silver source and the incorporated reducing agent. In contrast, conventional wet-processed black-and-white photographic materials use only one form of silver (i.e. silver halide) that, upon chemical development, is itself converted into the silver image, or upon physical development requires addition of an external silver source (or other reducible metal ions that form black images upon reduction to the corresponding metal). Thus, photothermographic materials require an amount of silver halide per unit area that is only a fraction of that used (as little as one-hundredth) of that used in a conventional wet-processed photographic material.

Moreover, in photothermographic systems, all of the "chemistry" for imaging is incorporated within the material itself. For example, such materials include a developer (i.e. a reducing agent for the reducible silver ions) while photographic materials usually do not. Even in so-called "instant photography", the developer chemistry is physically separated from the photosensitive silver halide until development is desired. The incorporation of the developer into substantially light-insensitive thermographic and photothermographic materials can lead to the increased formation of various types of "fog" or other undesirable sensitometric side effects. Therefore, much effort has gone into the preparation and manufacture of substantially light-insensitive thermographic and photothermographic materials to minimize these problems during the preparation of the substantially light-insensitive thermographic and photothermographic dispersions as well as during coating, storage, and post-processing handling.

Moreover, in photothermographic materials, the unexposed silver halide generally remains intact after development and the material must be stabilized against further imaging and development. In contrast, silver halide is removed from conventional photographic materials after solution development to prevent further imaging (i.e. in the aqueous fixing step).

In photothermographic and substantially light-insensitive thermographic materials, the binder is capable of wide variation and a number of binders (both hydrophilic and hydrophobic) are useful. In contrast, conventional photographic materials are limited almost exclusively to hydrophilic binders such as gelatin.

Because photothermographic and substantially light-insensitive thermographic elements require thermal processing, they pose different considerations and present distinctly different problems in manufacture and use, compared to conventional wet-processed silver halide photographic materials. Additives that have one effect in conventional silver halide photographic materials may behave quite differently when incorporated in substantially light-insensitive thermographic or photothermographic materials where the underlying chemistry is significantly more complex. The incorporation of such additives as, for example, stabilizers, antifoggants, speed enhancers, sensitizers, supersensitizers and spectral and chemical sensitizers in conventional photographic materials is not predictive of whether such additives will prove beneficial or detrimental in substantially light-insensitive thermographic or photothermographic materials. For example, it is not uncommon for a photographic antifoggant useful in conventional photographic materials to cause various types of fog when incorporated into substantially light-insensitive thermographic or photothermographic materials, or for supersensitizers that are effective in photographic materials to be inactive in photothermographic materials.

These and other distinctions between photothermographic and substantially light-insensitive thermographic materials and photographic materials are described in *Imaging Processes and Materials* (*Neblette's Eighth Edition*); J. Sturge et al, Ed; Van Nostrand Rheinhold: New York, 1989; Chapter 9 and in *Unconventional Imaging processes*; E. Brinckman et al., Ed: The focal Press: London and New York: 1978: pp. 74–75, and in Zou, Sahyun, Levy and Serpone, *J. Imaging Sci. Technol.* 1996, 40, pp. 94–103.

Differences Between Substantially Light-insensitive Thermographic Recording Materials and Photothermographic Recording Materials The technology of substantially light-insensitive thermographic materials in which image formation is based on the reduction of organic silver salts is significantly different from that of photothermographic recording materials, despite the fact that in both cases the image results from the reduction of organic silver salts. However, this a superficial similarity masking the fact that the realization of the species which catalyze this reduction is completely different, being image-wise exposure of photosensitive silver halide-containing photo-addressable thermally developable elements in the case of photothermographic recording materials and image-wise heating of thermosensitive elements which do not contain photosensitive silver halide in the case of thermographic recording materials. This difference in technology is further underlined by the nature of the ingredients used in the two types of materials, the most significant difference being the absence of photosensitive silver halide and spectral sensitizing agents in substantially light-insensitive thermographic recording materials, but also reflected in the different reducing agents used, stronger reducing agents being used in substantially light-insensitive thermographic recording materials, the different stabilizers, the different toning agents etc. Furthermore, the thermal development processes themselves are significantly different in that the whole material is heated at temperatures of less than 150° C. for periods of seconds (e.g. 10 s) in the case of photothermographic recording materials, whereas in the case of substantially light-insensitive thermographic recording materials the materials are image-wise heated at much higher temperatures for periods of ms (e.g. 10–20 ms). Realization of a neutral image tone is a major problem in the case of substantially light-insensitive thermographic recording materials due to the very short heating times, whereas it is much less of a problem in photothermographic recording materials due to the much longer heating times.

Problem to be Solved

Thermographic and photothermographic materials with prior art toning agents exhibit poor storage properties, as is the case with e.g. phthalazinone, and/or an image colour which has an insufficiently neutral tone for black and white images, as is the case with e.g. succinimide, phthalimide, phthalic acid and phthalazine. The use of 3,4-dihydro-2,4-dioxo-1,3,2H-benzoxazine as a toning agent in thermographic materials, as disclosed in U.S. Pat. No. 3,951,660, represented an improvement in storage properties and in the neutrality of the image tone, whether substituted, as disclosed in U.S. Pat. No. 3,885,967 and U.S. Pat. No. 3,951,660, or unsubstituted, as disclosed in U.S. Pat. No. 3,951,660. Such toning agents are insufficiently soluble in ecologically acceptable coating solvents and thermographic materials containing these toning agents exhibit a undesirably strong deterioration in image colour and an undesirable increase in image background (fog) upon storage. Furthermore, such toning agents diffuse through the thermographic materials to the thermal head resulting in cloudiness in the imaging material, deposits of ingredients and by-products from the image-forming process on the surface of the thermographic material and, in the case of substantially light-insensitive thermographic materials in thermal head printers, image degradation due to thermal head contamination.

ASPECTS OF THE INVENTION

It is therefore an aspect of the present invention to provide toning agents for use in substantially light-insensitive thermographic recording materials suitable for use in thermographic printers without adverse effect on the image tone.

It is therefore an aspect of the present invention to provide toning agents for use in photothermographic materials suitable for use in photothermographic printers without adverse effect on the image tone.

Further aspects and advantages of the invention will become apparent from the description hereinafter.

SUMMARY OF THE INVENTION

It has been surprisingly found that 2-hydroxy-pyrimidine derivatives which adsorb particularly rapidly on silver nano-particles as demonstrated by time-resolved SERS measurements and bring about rapid aggregation thereof render the image tone of thermographic materials more neutral in thermographic materials, whose image forming process is based upon the image-wise reduction of substantially light-insensitive organic silver salts, i.e. exhibit so-called toning properties. Moreover, it has been surprisingly found that in a particular binder matrix a combination of toning agents both exhibiting rapid adsorption on silver nano-particles and capable of bringing about rapid aggregation thereof, but exhibiting slow and fast diffusion respectively in the particular polymer matrix, exhibit favourable synergistic effects with respect to image tone and diffusion thereof to the surface of the thermographic materials.

Aspects of the present invention are realized with a black and white monosheet thermographic recording material comprising a support and a thermosensitive element, the thermosensitive element containing a substantially light-insensitive organic silver salt, an organic reducing agent therefor in thermal working relationship therewith, a binder and at least one toning agent, wherein the at least one toning agent is represented by formula (I):

(I)

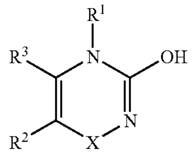

wherein $R^1$ is a hydrogen atom or an alkyl, an alkenyl, an alkynyl, a cycloalkyl, an alkaryl, an aryl, a heterocyclic or a heteroaryl group all of which may be optionally substituted; $R^2$ and $R^3$ are independently a hydrogen or a halogen atom or an amino, amide, ester, carboxy, carbonate, alkyl, alkenyl, alkynyl, cycloalkyl, alkaryl, aryl, heterocyclic or heteroaryl group all of which may be optionally substituted; $R^2$ and $R^3$ may together represent the atoms necessary to complete a heteroaromatic ring with no more than one nitrogen atom, an alicyclic ring or a heterocyclic ring which all may be optionally substituted; X is a carbonyl group, or is —N—$R^4$, where $R^4$ is an alkyl group; and with the proviso that $R^1$ may not be a hydrogen atom if both $R^2$ and $R^3$ are both hydrogen atoms.

Aspects of the present invention are also realized by the use of compounds according to the above-mentioned formula (I) as toning agents in imaging processes involving silver particles.

Preferred embodiments of the present invention are disclosed in the detailed description of the invention.

DETAILED DESCRIPTION OF THE INVENTION

Definitions

The term thermographic material as used in disclosing the present invention includes both photothermographic materials and substantially light-insensitive thermographic materials.

The term alkyl means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term acyl group as used in disclosing the present invention means —(C═O)-aryl and —(C═O)-alkyl groups.

The term carbocyclic ring includes both alicylic rings and aromatic rings.

Substantially light-insensitive means not intentionally light sensitive.

The L*, a* and b* CIELAB-values are defined in ASTM Norm E179-90 in a R(45/0) geometry with evaluation according to ASTM Norm E308-90 and have been used to characterize the image tone of thermographic materials of the present invention.

Heating in association with the expression a substantially water-free condition as used herein, means heating at a temperature of 80 to 250° C. The term "substantially water-free condition" as used herein means that the reaction system is approximately in equilibrium with water in the air, and water for inducing or promoting the reaction is not particularly or positively supplied from the exterior to the element. Such a condition is described in T. H. James, "The Theory of the Photographic Process", Fourth Edition, Macmillan 1977, page 374.

Thermosensitive Element

The term thermosensitive element as used herein is that element which contains all the ingredients which contribute to image formation. According to the present invention, the thermosensitive element contains one or more substantially light-insensitive organic silver salts, one or more reducing agents therefor in thermal working relationship therewith and a binder. The element may comprise a layer system in which the above-mentioned ingredients may be dispersed in different layers, with the proviso that the substantially light-insensitive organic silver salts are in reactive association with the reducing agents i.e. during the thermal development process the reducing agent must be present in such a way that it is able to diffuse to the particles of substantially light-insensitive organic silver salt so that reduction to silver can occur. Such materials include the possibility of one or more substantially light-insensitive organic silver salts and/or one of more organic reducing agents therefor being encapsulated in heat-responsive microcapsules, such as disclosed in EP-A 0 736 799 herein incorporated by reference.

Compounds Represented by Formula (I)

Aspects of the present invention are realized with a black and white monosheet thermographic recording material comprising a support and a thermosensitive element, the thermosensitive element containing a substantially light-insensitive organic silver salt, an organic reducing agent therefor in thermal working relationship therewith, a binder and at least one toning agent, wherein the at least one toning agent is a compound represented by formula (I).

According to a first embodiment of the black and white monosheet thermographic recording material, according to the present invention, $R^1$ is an alkyl, an alkenyl, an alkynyl, a cycloalkyl, an alkaryl, an aryl, a heterocyclic or a heteroaryl group all of which may be optionally substituted.

According to a second embodiment of the black and white monosheet thermographic recording material, according to the present invention, the compound according to formula (I) is represented by formula (II):

(II)

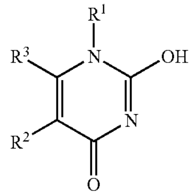

wherein $R^1$ is a hydrogen atom or an alkyl, an alkenyl, an alkynyl, a cycloalkyl, an alkaryl, an aryl, a heterocyclic or a heteroaryl group all of which may be optionally substituted; $R^2$ and $R^3$ are independently a hydrogen or a halogen atom or an amino, amide, ester, carboxy, carbonato, alkyl, alkenyl, alkynyl, cycloalkyl, alkaryl, aryl, heterocyclic or heteroaryl group all of which may be optionally substituted; $R^2$ and $R^3$ may together represent the atoms necessary to complete a heteroaromatic ring with no more than one nitrogen atom, an alicyclic ring or a heterocyclic ring which all may be optionally substituted; and with the proviso that $R^1$ may not be a hydrogen atom if both $R^2$ and $R^3$ are both hydrogen atoms.

According to a third embodiment of the black and white monosheet thermographic recording material, according to the present invention, the 2-hydroxy-pyrimidine derivative is selected from the group consisting of 2-hydroxy-pyrimidines annelated with a heterocyclic ring, 2-hydroxy-pyrimidine derivatives annelated with a carbocyclic ring including purine derivatives.

According to a fourth embodiment of the black and white monosheet thermographic recording material, according to the present invention, the substituent for $R^1$ is selected from the group consisting of alkyl, aryl, alkoxy, hydroxy, carboxy, ester, amide, sulfo and sulfoalkyl groups.

According to a fifth embodiment of the black and white monosheet thermographic recording material, according to the present invention, the substituent for $R^2$ is selected from the group consisting of alkyl, aryl, alkoxy, hydroxy, carboxy, ester, amide, sulfo and sulfoalkyl groups.

According to a sixth embodiment of the black and white monosheet thermographic recording material, according to the present invention, the substituent for $R^3$ is selected from the group consisting of alkyl, aryl, alkoxy, hydroxy, carboxy, ester, amide, sulfo and sulfoalkyl groups.

According to a seventh embodiment of the black and white monosheet thermographic recording material, according to the present invention, the compound according to formula (I) is selected from the group consisting of: xanthine (2,6-dihydroxy-purine), xanthine derivatives and 2,6,8-trihydroxy-purine (uric acid).

According to an eighth embodiment of the black and white monosheet thermographic recording material, according to the present invention, the compound according to formula (I) is selected from the group consisting of

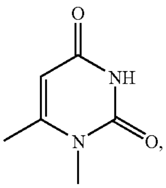,
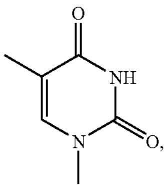,
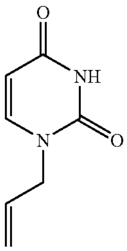
and
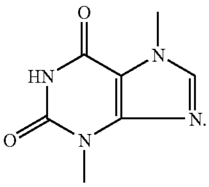.

Suitable compounds according to formula (I), according to the present invention, include:

| toning agent nr. | |
|---|---|
| TA-1 | 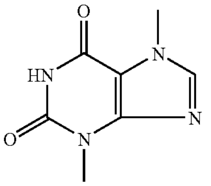 3,7-dimethyl-xanthine (theobromine) |
| TA-2 | 3-methyl-xanthine |
| TA-3 | 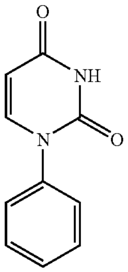 |
| TA-4 | 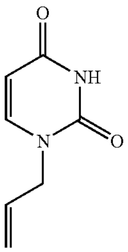 |
| TA-5 | 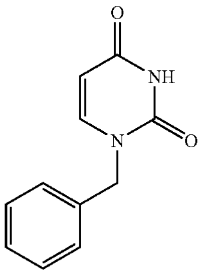 |
| TA-6 | 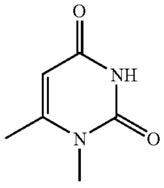 |
| TA-7 | 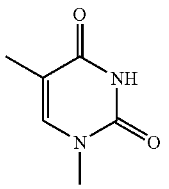 |

-continued

| toning agent nr. | |
|---|---|
| TA-8 | 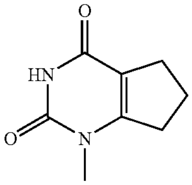 |
| TA-9 | 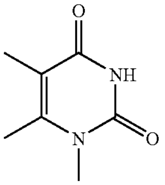 |
| TA-10 | 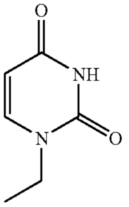 |
| TA-11 | 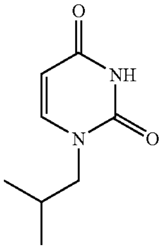 |
| TA-12 | 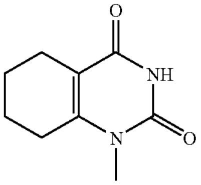 |
| TA-13 | 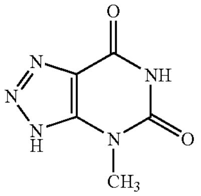 |
| TA-14 | 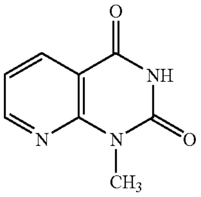 |

-continued

| toning agent nr. | |
|---|---|
| TA-15 | 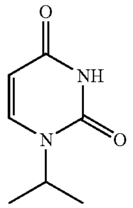 |
| TA-16 | 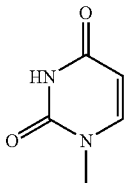 |
| TA-17 | xanthine (2,6-dihydroxy-purine) |
| TA-18 | 2,6,8-trihydroxy-purine (uric acid) |
| TA-19 | 2,4-dihydroxy-5-methyl-pyrimidine (5-methyl-uracil) |
| TA-20 | alloxan [2,4,5,6(1H,3H)-pyrimidinetetrone) |
| TA-21 | 2,4-dihydroxy-pyrimidine-6-carboxylic acid (orotic acid) |
| TA-22 | 2,4-dihydraxy-pyrimidine-5-carboxylic acid |

Co-Toning Agents

According to a ninth embodiment of the black and white monosheet thermographic recording material, according to the present invention, the thermosensitive element further contains at least one toning agent selected from the group consisting of compounds according to formula (III), (III)

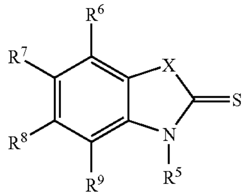

wherein $R^5$ is an alkyl group optionally substituted with a hydroxy, carboxy, carboxy ester, acyl or carbonate group; X is S, O or N—$R^{10}$; $R^6$ is an optionally substituted alkyl group; $R^6$, $R^7$, $R^8$ and $R^9$ independently represent a hydrogen atom, a halogen atom or an alkyl, an alkoxy, a thioalkoxy, a nitro, a cyano, a carboxy, a carboxy ester, an acyl, an aldehyde, an acylamido, a sulphonamido, an acylamino, a carbonato, a hydroxy or an aryl group or at least one of $R^6$ and $R^7$, $R^7$ and $R^8$ and $R^8$ and $R^9$ independently represent the atoms necessary to form a carbocyclic or heterocyclic group or at least one of $R^5$ and $R^9$ and $R^6$ and $R^{10}$ independently represent the atoms necessary to form a heterocyclic ring; compounds represented by formula (IV):

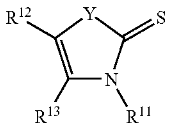

(IV)

wherein $R^{11}$ is an optionally substituted alkyl group; Y is S, O or N—$R^{14}$; $R^{14}$ is an optionally substituted alkyl group; $R^{12}$ and $R^{13}$ independently represent a hydrogen atom, a halogen atom or an alkyl, an alkoxy, a thio-alkoxy, a nitro, a cyano, a carboxy, a carboxy ester, an acyl, an aldehyde, an acylamido, a sulphonamido, an acylamino, a carbonate, a hydroxy or an aryl group or $R^{12}$ and $R^{13}$ represent the atoms necessary to form a heterocyclic or a non-aromatic carbocyclic ring or at least one of $R^{12}$ and $R^{14}$ and $R^{13}$ and $R^{11}$ independently represent the atoms necessary to form a heterocyclic ring; and both $R^{12}$ and $R^{13}$ cannot both be an alkyl group, phthalazinone, phthalazinone derivatives, pyridazone, pyridazone derivatives, benzoxazine dione, benzoxazine dione derivatives, naphthoxazine dione and naphthoxazine dione derivatives.

Suitable co-toning agents according to formula (I) are:

| co-toning agent nr. | |
|---|---|
| CTA-I-1 | 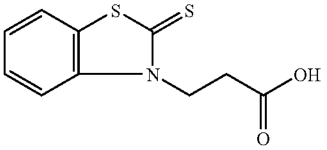 |
| CTA-I-2 | 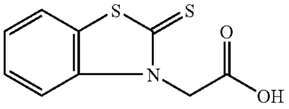 |
| CTA-I-3 | 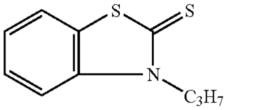 |
| CTA-I-4 | 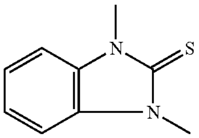 |
| CTA-I-5 | 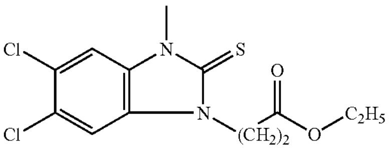 |
| CTA-I-6 | 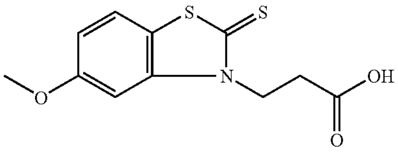 |

-continued

| co-toning agent nr. | |
|---|---|
| CTA-1-7 | 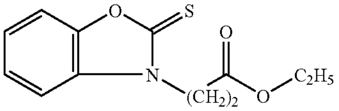 |
| CTA-I-8 | 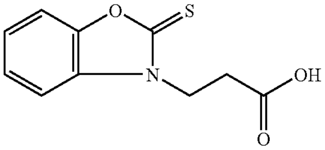 |
| CTA-I-9 | 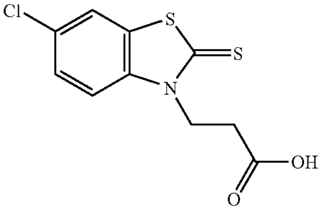 |
| CTA-I-10 | 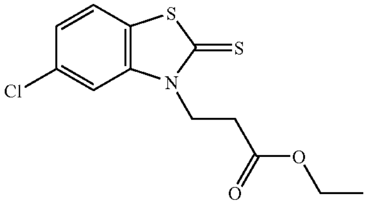 |
| CTA-I-11 | 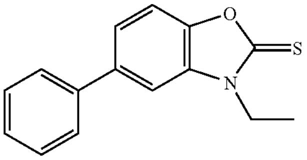 |

Suitable co-toning agents represented by formula (II) according to the present invention include:

| co-toning agent nr. | |
|---|---|
| CTA-II-1 | 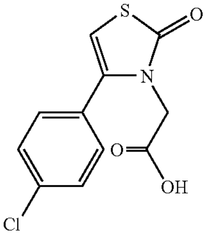 |
| CTA-II-2 | 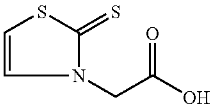 |

-continued

| co-toning agent nr. | |
|---|---|
| CTA-II-3 | 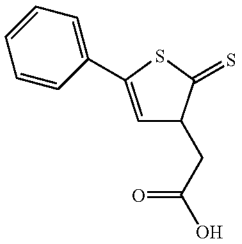 |
| CTA-II-4 | 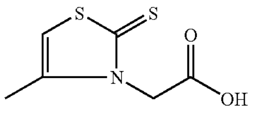 |
| CTA-II-5 | 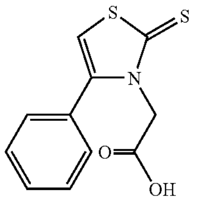 |
| CTA-II-6 | 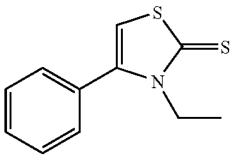 |
| CTA-11-7 | 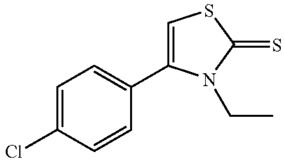 |

Suitable benzoxazine dione co-toning agents are:

| co-toning agent nr. | |
|---|---|
| BOD01 | 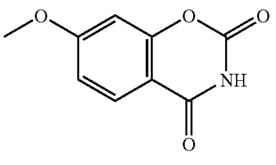 7-methoxy-benzo[e][1,3]oxazine-2,4-dione |
| BOD02 | 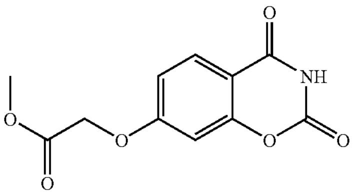 |

-continued

| co-toning agent nr. | |
|---|---|
| BOD03 | 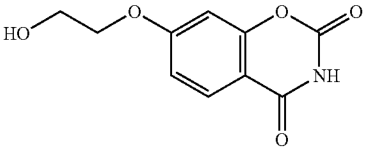 |
| BOD04 | 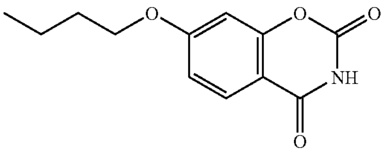 7-butoxy-benzo[e][1,3]oxazine-2,4-dione |
| BOD05 | 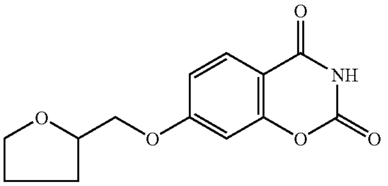 |
| BOD06 | 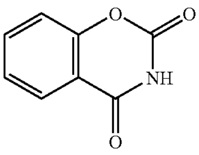 benzo[e][1,3]oxazine-2,4-dione |
| BOD07 | 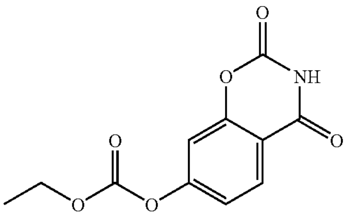 7-(ethylcarbonato)-benzo[e][1,3]oxazine-2,4-dione |
| BOD08 | 7-methyl-benzo[e][1,3]oxazine-2,4-dione |

The synergetic effect of a combination of two toning agents, according to the present invention, or one toning agent according to the present invention, together with a further toning agent, such as benzoxazine dione, a benzoxazine dione derivative, phthalazinone, a phthalazinone derivative, pyridazone or a pyridazone derivative, in obtaining a more neutral image tone than would be expected by additive combination of the image tone obtained with the toning agents separately may, we believe, be due to combining toning agents which exhibit good silver nanoparticle-aggregating properties but have very different diffusion coefficients.

According to a tenth embodiment of the black and white-monosheet thermographic recording material, according to the present invention, the thermosensitive element contains at least two toning agents with a diffusion in the binder differing by at least a factor of 2, but less than a factor of 1000 and preferably by at least a factor of 10.

According to an eleventh embodiment of the black and white monosheet thermographic recording material, according to the present invention, the thermosensitive element further contains at least one toning agent selected from the group consisting of benzo[e][1,3]oxazine-2,4-dione, 7-methyl-benzo[e][1,3]oxazine-2,4-dione, 7-methoxy-benzo[e][1,3]oxazine-2,4-dione, 7-butoxybenzo[e][1,3]oxazine-2,4-dione, 7-(ethylcarbonato)-benzo[e][1,3]oxazine-2,4-dione,

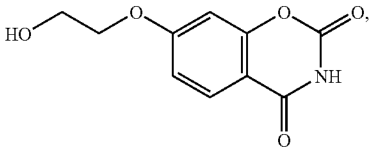

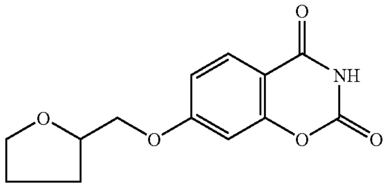

and

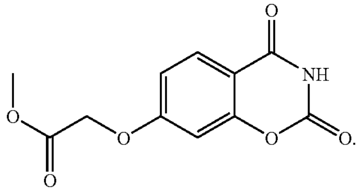

Organic Silver Salt

According to a twelfth embodiment of the black and white monosheet thermographic recording material of the present invention, the organic silver salts are not double organic salts containing a silver cation associated with a second cation e.g. magnesium or iron ions.

According to a thirteenth embodiment of the black and white monosheet thermographic recording material of the present invention, at least one of the organic silver salts is a substantially light-insensitive silver salt of an organic carboxylic acid.

According to a fourteenth embodiment of the black and white monosheet thermographic recording material of the present invention, at least one of the organic silver salts is a substantially light-insensitive silver salt of an aliphatic carboxylic acids known as a fatty acid, wherein the aliphatic carbon chain has preferably at least 12 C-atoms, e.g. silver laurate, silver palmitate, silver stearate, silver hydroxystearate, silver oleate and silver behenate, which silver salts are also called “silver soaps”. Other silver salts of an organic carboxylic acid as described in GB-P 1,439,478, e.g. silver benzoate, may likewise be used to produce a thermally developable silver image. Combinations of different silver salt of an organic carboxylic acids may also be used in the present invention, as disclosed in EP-A 964 300.

Organic silver salts may be dispersed by standard dispersion techniques. Ball mills, bead mills, microfluidizers, ultrasonic apparatuses, rotor stator mixers etc. have been found to be useful in this regard. Mixtures of organic silver salt dispersions produced by different techniques may also be used to obtain the desired thermographic properties e.g. of coarser and more finely ground dispersions of organic silver salts.

Reducing Agents

According to a fifteenth embodiment of the black and white thermographic recording material, according to the present invention, the reducing agent is an organic compound containing at least one active hydrogen atom linked to O, N or C, such as is the case with, aromatic di- and tri-hydroxy compounds. 1,2-dihydroxybenzene derivatives, such as catechol, 3-(3,4-dihydroxyphenyl) propionic acid, 1,2-dihydroxybenzoic acid, gallic acid and esters e.g. methyl gallate, ethyl gallate, propyl gallate and 3,4-dihydroxybenzoic acid esters are preferred, with those described in EP-A 0 692 733, EP-A 0 903-625, EP-A 1 245 403 and EP-A 1 245 404 herein incorporated by reference being particularly preferred e.g. ethyl 3,4-dihydroxybenzoate, n-butyl 3,4-dihydroxybenzoate, 3,4-dihydroxy-benzaldehyde, 3,4-dihydroxy-acetophenone, 3,4-butyrophenone, 3,4-dihydroxy-benzophenone, 3,4-dihydroxybenzophenone derivatives, 3,4-dihydroxy-benzonitrile, and tannic acid.

Combinations of reducing agents may also be used that on heating become reactive partners in the reduction of the one or more substantially light-insensitive organic silver salt. For example, combinations of sterically hindered phenols with sulfonyl hydrazide reducing agents such as disclosed in U.S. Pat. No. 5,464,738; trityl hydrazides and formyl-phenyl-hydrazides such as disclosed in U.S. Pat. No. 5,496,695; trityl hydrazides and formyl-phenyl-hydrazides with diverse auxiliary reducing agents as disclosed in U.S. Pat. No. 5,545,505, U.S. Pat. No. 5,545,507 and U.S. Pat. No. 5,558,983; acrylonitrile compounds as disclosed in U.S. Pat. No. 5,545,515 and U.S. Pat. No. 5,635,339; and 2-substituted malonodialdehyde compounds as disclosed in U.S. Pat. No. 5,654,130.

Binder of the Thermosensitive Element

The film-forming binder of the thermosensitive element may be all kinds of natural, modified natural or synthetic resins or mixtures of such resins, in which the at least one organic silver salt can be dispersed homogeneously either in aqueous or solvent media: e.g. cellulose derivatives, starch ethers, galactomannan, polymers derived from α,β-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl alcohol, polyvinyl acetals that are made from polyvinyl alcohol as starting material in which only a part of the repeating vinyl alcohol units may have reacted with an aldehyde, preferably polyvinyl butyral, copolymers of acrylonitrile and acrylamide, polyacrylates, polymethacrylates, polystyrene and polyethylene or mixtures thereof.

Suitable water-soluble film-forming binders for use in thermographic recording materials according to the present invention are: polyvinyl alcohol, polyacrylamide, polymethacrylamide, polyacrylic acid, polymethacrylic acid, polyvinylpyrrolidone, polyethyleneglycol, proteinaceous binders, polysaccharides and water-soluble cellulose derivatives. A preferred water-soluble binder for use in the thermographic recording materials of the is present invention is gelatine.

The binder to organic silver salt weight ratio is preferably in the range of 0.2 to 7, and the thickness of the thermosensitive element is preferably in the range of 5 to 50 μm. Binders are preferred which do not contain additives, such as certain antioxidants (e.g. 2,6-di-tert-butyl-4-methylphenol), or impurities which adversely affect the thermographic properties of the thermographic recording materials in which they are used.

Stabilizers

According to a sixteenth embodiment of the black and white monosheet thermographic recording material, according to the present invention, the thermosensitive element further contains a stabilizer.

According to a seventeenth embodiment of the black and white monosheet thermographic recording material, according to the present invention, the thermosensitive element further contains a stabilizer selected from the group consisting of benzotriazole; substituted benzotriazoles; aromatic polycarboxylic acid, such as ortho-phthalic acid, 3-nitrophthalic acid, tetrachlorophthalic acid, mellitic acid, pyromellitic acid and trimellitic acid and anhydrides thereof; 1-phenyl-5-mercaptotetrazole compounds in which the phenyl group is substituted with a substituent containing an optionally substituted aryl group, 1-(5-mercapto-1-tetrazolyl)-acetyl compounds represented by formula (V):

(V)

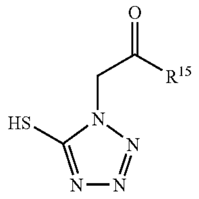

wherein $R^3$ is —$NR^4R^5$, —$OR^6$ or an optionally substituted aryl or heteroaryl group; $R^4$ is hydrogen or an optionally substituted alkyl, aryl or heteroaryl group; $R^5$ is an optionally substituted aryl or heteroaryl group; and $R^6$ is an optionally substituted aryl group; and compounds with two or more groups represented by formula (VI):

(VI)

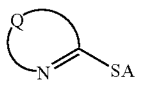

where Q comprises the necessary atoms to form a 5- or 6-membered unsaturated heterocyclic ring, A is hydrogen, a counterion to compensate the negative charge of the thiolate group or two or more A groups provide a linking group between the two or more groups represented by formula (VI).

According to an eighteenth embodiment of the black and white is monosheet thermographic recording material, according to the present invention, the thermosensitive element further contains at least one optionally substituted aliphatic or carbocyclic polycarboxylic acid and/or anhydride thereof in a molar percentage of at least 15 with respect to all the organic silver salt(s) present and in thermal working relationship therewith. The polycarboxylic acid may be used in anhydride form or partially esterified on the condition that at least two free carboxylic acids remain or are available during the heat recording step.

Photosensitive Silver Halide

According to a nineteenth embodiment of the black and white monosheet thermographic material, according to the present invention, the thermosensitive element further contains photosensitive silver halide, thereby rendering the thermographic material photothermographic.

The photosensitive silver halide used in the present invention may be employed in a range of 0.1 to 100 mol percent; preferably, from 0.2 to 80 mol percent; particularly preferably from 0.3 to 50 mol percent; especially preferably from 0.5 to 35 mol %; and especially from 1 to 12 mol % of substantially light-insensitive organic silver salt.

The silver halide may be any photosensitive silver halide such as silver bromide, silver iodide, silver chloride, silver bromoiodide, silver chlorobromoiodide, silver chlorobromide etc. The silver halide may be in any form which is photosensitive including, but not limited to, cubic, orthorhombic, tabular, tetrahedral, octagonal etc. and may have epitaxial growth of crystals thereon.

The silver halide used in the present invention may be chemically sensitized with a chemical sensitising merocyanine dye containing a thione group, and optionally with a chemical sensitizing agent such as a compound containing sulphur, selenium, tellurium etc., or a compound containing gold, platinum, palladium, iron, ruthenium, rhodium or iridium etc. in addition to sensitization with specific reducing agents, according to the present invention. The details of these procedures are described in T. H. James, "The Theory of the Photographic Process", Fourth Edition, Macmillan Publishing Co. Inc., New York (1977), Chapter 5, pages 149 to 169.

The grain size of the silver halide particles can be determined by the Moeller Teller method in which the sample containing silver halide particles is sedimented upon a filter paper, which is submerged in electrolyte together with a negative platinum needle-shaped electrode and a reference electrode. The silver halide particles on the filter paper are slowly scanned individually with the needle-shaped electrode, whereupon the silver halide grains are individually electrochemically reduced at the cathode. This electrochemical reduction is accompanied by a current pulse, which is registered as a function of time and integrated to give the charge transfer Q for the electrochemical reduction of the silver halide particle, which is proportional to its volume. From their volume the equivalent circular grain diameter of each grain can be determined and therefrom the average particle size and size distribution.

Surfactants and Dispersants

Surfactants and dispersants aid the dispersion of ingredients which are insoluble in the particular dispersion medium. The substantially light-insensitive thermographic material used in the present invention may contain one or more surfactants, which may be anionic, non-ionic or cationic surfactants and/or one or more dispersants. Suitable dispersants are natural polymeric substances, synthetic polymeric substances and finely divided powders, e.g. finely divided non-metallic inorganic powders such as silica.

Support

According to a twentieth embodiment of the black and white monosheet thermographic recording material, according to the present invention, the support is transparent or translucent. It is preferably a thin flexible carrier made transparent resin film, e.g. made of a cellulose ester, e.g. cellulose triacetate, polypropylene, polycarbonate or polyester, e.g. polyethylene terephthalate. The support may be in sheet, ribbon or web form and subbed if needs be to improve the adherence to the thereon coated thermosensitive element. The support may be dyed or pigmented to provide a transparent coloured background for the image.

Protective Layer

According to a twenty-first embodiment of the black and white monosheet thermographic recording material, according to the present invention, the thermosensitive element is provided with a protective layer. In general this protects the thermosensitive element from atmospheric humidity and from surface damage by scratching etc. and prevents direct contact of printheads or heat sources with the recording layers. Protective layers for thermosensitive elements which come into contact with and have to be transported past a heat source under pressure, have to exhibit resistance to local deformation and good slipping characteristics during transport past the heat source during heating. A slipping layer, being the outermost layer, may comprise a dissolved lubricating material and/or particulate material, e.g. talc particles, optionally protruding from the outermost layer. Examples of suitable lubricating materials are a surface active agent, a liquid lubricant, a solid lubricant or mixtures thereof, with or without a polymeric binder.

Coating Techniques

The coating of any layer of the substantially light-insensitive thermographic material used in the present invention may proceed by any coating technique e.g. such as described in Modern Coating and Drying Technology, edited by Edward D. Cohen and Edgar B. Gutoff, (1992) VCH Publishers Inc., 220 East 23rd Street, Suite 909 New York, N.Y. 10010, USA. Coating may proceed from aqueous or solvent media with overcoating of dried, partially dried or undried layers.

Thermographic Processing

Thermographic imaging is carried out by the image-wise application of heat either in analogue fashion by direct exposure through an image or by reflection from an image, or in digital fashion pixel by pixel either by using an infra-red heat source, for example with a Nd-YAG laser or other infra-red laser, with a substantially light-insensitive thermographic material preferably containing an infra-red absorbing compound, or by direct thermal imaging with a thermal head.

In thermal printing image signals are converted into electric pulses and then through a driver circuit selectively transferred to a thermal printhead. The thermal printhead consists of microscopic heat resistor elements, which convert the electrical energy into heat via Joule effect. The operating temperature of common thermal printheads is in the range of 300 to 400° C. and the heating time per picture element (pixel) may be less than 11.0 ms, the pressure contact of the thermal printhead with the recording material being e.g. 200–1000 g/linear cm, i.e. with a contact zone (nip) of 200 to 300 μm a pressure of 5000 to 50,000 g/cm$^2$, to ensure a good transfer of heat.

Activation of the heating elements can be power-modulated or pulse-length modulated at constant power. EP-A 654 355 discloses a method for making an image by image-wise heating by means of a thermal head having energizable heating elements, wherein the activation of the heating elements is executed duty cycled pulsewise. EP-A 622 217 discloses a method for making an image using a direct thermal imaging element producing improvements in continuous tone reproduction.

Image-wise heating of the recording material can also be carried out using an electrically resistive ribbon incorporated into the material. Image- or pattern-wise heating of the recording material may also proceed by means of pixel-wise modulated ultra-sound.

Photothermographic Printing

Photothermographic recording materials, according to the present invention, may be exposed with radiation of wavelength between an X-ray wavelength and a 5 microns wavelength with the image either being obtained by pixel-wise exposure with a finely focused light source, such as a CRT light source; a UV, visible or IR wavelength laser, such as a Violet-laser, a He/Ne-laser or an IR-laser diode, e.g. emitting at 400 nm, 630 nm, 650 nm, 780 nm, 830 nm or 850 nm; or a light emitting diode, for example one emitting at 659 nm; or by direct exposure to the object itself or an image therefrom with appropriate illumination e.g. with UV, visible or IR light. For the thermal development of image-wise exposed photothermo-graphic recording materials, according to the present invention, any sort of heat source can be used that enables the recording materials to be uniformly heated to the development temperature in a time acceptable for the application concerned e.g. contact heating, radiative heating, microwave heating etc.

Industrial Application

Thermographic imaging can be used for the production of reflection type prints and transparencies, in particular for use in the medical diagnostic field in which black-imaged transparencies are widely used in inspection techniques operating with a light box.

The invention is illustrated hereinafter by way of comparative examples and invention examples. The percentages and ratios given in these examples are by weight unless otherwise indicated.

SYNTHESIS EXAMPLE 1

Synthesis of 1-phenyluracil (TA-3)

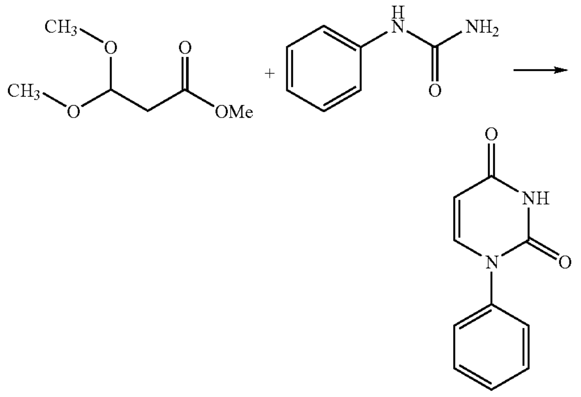

2.05 g NaH (41 mmol as 50% suspension in mineral oil) was added to 55 ml dry dioxane. 3.87 g (28.4 mmol) phenylurea was then added portionwise while keeping the reaction mixture under an argon atmosphere and then was heated for a few minutes to 50° C. After cooling the resulting mixture to room temperature, 6.31 g (42.6 mmol) of methyl 3,3-dimethoxypropionate was added, the mixture then refluxed for 2 hours, after which the resulting mixture was allowed to cool to room temperature. The cooled mixture was then poured into 280 ml 40% acetic acid, stored overnight in a refrigerator and then extracted twice with 140 ml chloroform. The collected chloroform fractions were dried over $MgSO_4$ and evaporated under reduced pressure. The residue was crystallized from methanol using after treatment with activated carbon yielding 0.88 g (16%) of 1-phenyluracil (m.p. 244–245° C., Lit. 244–255° C. (Winckelmann et al., Synthesis 1986, 1041)).

SYNTHESIS EXAMPLE 2

Synthesis of 1-allyluracil (TA-4)

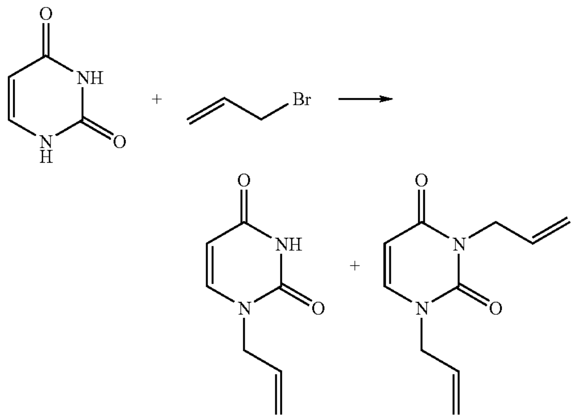

2.5 g (104 mmol, 80% suspension) of NaH was added to a suspension of 10.5 g (93 mmol) uracil in 100 ml DMF and the reaction allowed to continue for 2 hours at room temperature. After 2 hours 10.73 mL (15 g, 123 mmol) allylbromide was added and the mixture heated for 2 hours at 70° C. The solvent was removed under reduced pressure and the residue treated with methylene chloride. The residue from the methylene chloride extract was a mixture of mono-allyl- and di-allyl-uracil. 5.5 g (39%) of 1-allyluracil was isolated by preparative column chromatography, using chlormoform/methanol 40:1 as eluant (m.p. 108–109° C., Lit. 105–109° C., Beilstein).

SYNTHESIS EXAMPLE 3

Synthesis of 1-benzyluracil (TA-5)

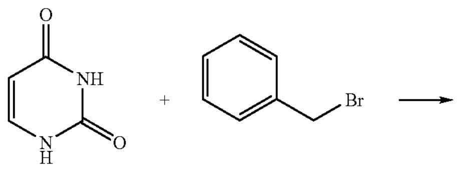

-continued

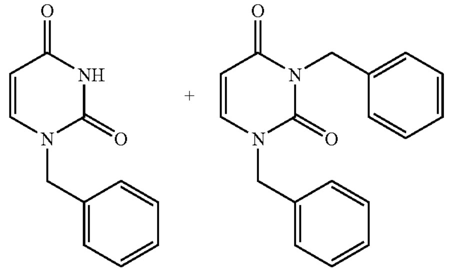

A suspension of 10 g (89 mmol) of uracil and 24.6 g of potassium carbonate in 350 mL DMF was stirred for 12 hours at room temperature, after which 16.5 mL (139 mmol) of benzyl bromide was added and the reaction allowed to continue for 2 days at room temperature. The undissolved residue was removed by filtration and the solvent removed from the filtrate under reduced pressure. 150 mL water was added to the residue and the mixture extracted 3 times with 100 mL methylene chloride. The collected methylene chloride fractions were washed with water, dried over $MgSO_4$ and evaporated to dryness under reduced pressure. The residue was treated with a small amount of chloroform/methanol 40:1 from which 1-benzyluracil partially crystallizes. 2.6 g 1-benzyluracil was isolated by filtration and the rest was isolated by preparative column chromatography, using chloroform/methanol 40:1 giving a yield of 3.95 g (22%)(m.p. 168–170° C., Lit. 168–170° C., Kundu et al., J. Chem. Soc. Perkin Trans 1, 1985, 1295).

SYNTHESIS EXAMPLE 4

Synthesis of 1,6-dimethyluracil

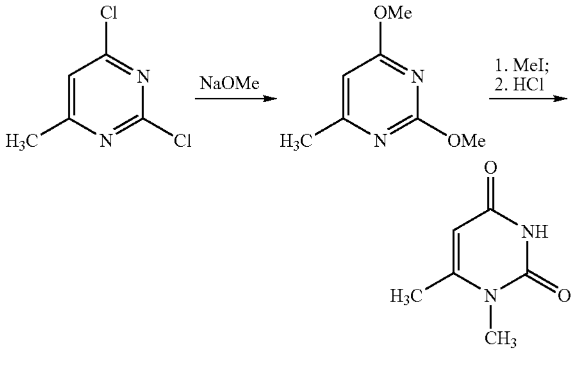

18.31 g (0.112 mol) of 2,4-dichloro-6-methylpyrimidine was added portionwise to 115 mL of a solution of sodium methanolate in methanol containing 0.23 mol sodium methanolate. After 1 hour at room temperature the reaction mixture was refluxed for 30 minutes. The solvent was removed under reduced pressure, the residue treated with 100 mL water and then extracted twice with 100 mL diethylether. The collected ether fractions were dried over $MgSO_4$ and evaporated under reduced pressure. 14.2 g (82%) of the crude intermediate 2,4-dimethoxy-6-methylpyrimidine was isolated, which was sufficiently pure to be used without further purification.

14.2 g (92 mmol) 2,4-dimethoxy-6-methylpyrimidine was dissolved in 210 mL iodomethane and the reaction allowed to continue for 2 days at room temperature. After 2 days, the excess of iodomethane was evaporated off under reduced pressure, the residue treated with 675 mL 1 N HCl and the resulting mixture refluxed for one and a half hours. After cooling to room temperature and neutralization with a concentrated sodium hydroxide solution, the water was removed under reduced pressure and the residue extracted with chloroform using a Soxhlet extractor. The chloroform was evaporated under reduced pressure and the crude compound recrystallized first from ethanol and then from water yielding 4.03 g (31%) of 1,6-dimethyluracil (m.p. 221–223° C.).

SYNTHESIS EXAMPLE 4

Synthesis of 1,5-dimethyluracil (TA-7)

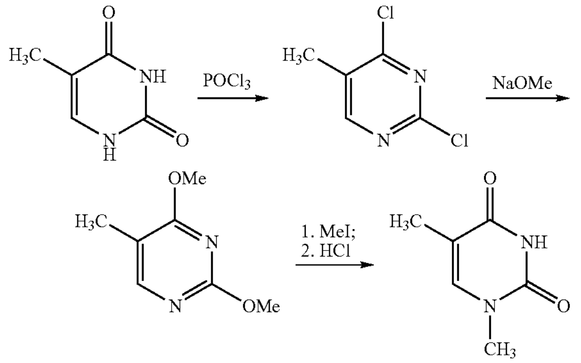

10 g (79.3 mmol) of thymine was dissolved in 80 mL $POCl_3$ and the mixture is refluxed for 5 hours. The excess of $POCl_3$ was evaporated off under reduced pressure and the residue treated with ice-water and extracted 4 times with 100 mL diethylether. The collected ether fractions were extracted once with water, once with 1 N NaOH, a second time with water, dried over $MgSO_4$ and finally evaporated under reduced pressure. 9.5 g (74%) of the intermediate, 2,4-dichloro-5-methylpyrimidine, was isolated and could be used without further purification.

9.5 g (58.5 mmol) of 2,4-dichloro-5-methylpyrimidine was added portionwise to 45 mL of a solution of sodium methanolate in methanol containing 145 mmol sodium methanolate. After 10 minutes at room temperature, the reaction mixture was refluxed for 5 minutes, after which the solvent was evaporated under reduced pressure. The residue was treated with 100 mL water and the mixture extracted twice with diethylether. The collected diethylether fractions were washed with water, dried over $MgSO_4$ and then evaporated under reduced pressure yielding 5.9 g (66%) of the intermediate 2,4-dimethoxy-5-methylpyrimidine (m.p. 61° C., Lit. m.p. 61° C.).

5.9 g (18.7 mmol) of 2,4-dimethoxy-5-methylpyrimidine was dissolved in 80 mL iodomethane and the reaction allowed to continue for 2 days at room temperature. The excess iodomethane was evaporated under reduced pressure, the residue treated with 140 mL 1 N HCl and the mixture refluxed for one and a half hour. 1,5-dimethyluracil crystallized from the medium and was isolated by filtration, washed twice with water and dried yielding 4.4 g of 1,4-dimethyluracil (m.p. unsharp 273–291, Lit. 280–291).

SYNTHESIS EXAMPLE 6

Synthesis of 1-methyl-2,4-dioxo-1,2,3,4,6,7-hexahydro-5H-cyclopenta[d]pyrimidine (TA-8)

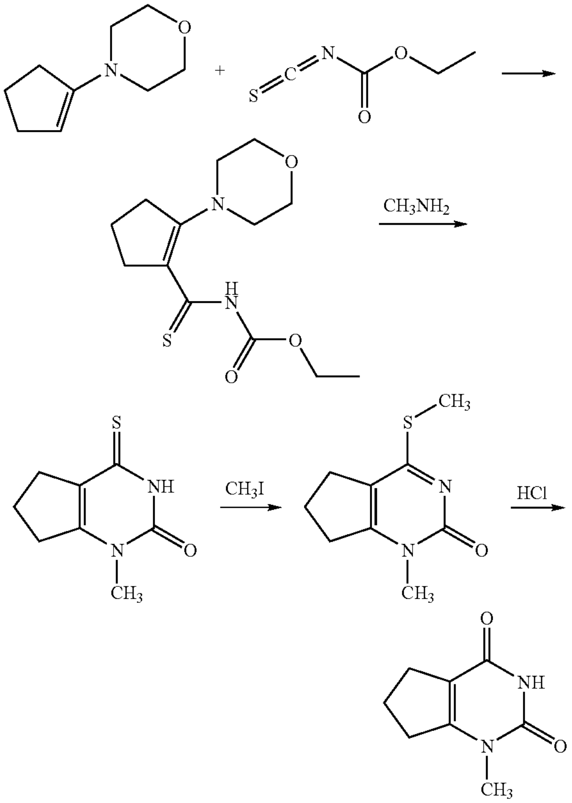

A solution of 13.1 g (0.10 mol) ethoxycarbonylisothiocyanaat in 15 mL diethylether was added dropwise to a solution of 15.3 g (0.10 mol) 1-morpholinocyclopentene in 60 mL diethylether. After 1 hour at room temperature, 1-(ethoxycarbonylthiocarbamoyl)-2-morpholinocyclopentene precipitated from the medium and was isolated by filtration. The isolated intermediate, 1-(ethoxycarbonylthiocarbamoyl)-2-morpholinocyclopentene, was washed with diethylether and dried yielding 24.7 g (87%) of 1-(ethoxycarbonylthiocarbamoy)-2-morpholinocyclopentene (m.p. 114–118° C., Lit. 124–125° C.).

14.6 g (51 mmol) 1-(ethoxycarbonylthiocarbamoy)-2-morpholinocyclopentene was dissolved in 145 mL of a 40% solution of methylamine in water. After 12 hours at room temperature, the excess of methylamine was removed under reduced pressure and the pH of the residual solution adjusted to pH=3 with concentrated hydrochloric acid. 1-methyl-2-oxo-4-thiono-1,2,3,4,6,7-hexahydro-5H-cyclopenta[d]pyrimidine precipitated from the medium, was isolated by filtration, washed with water and finally dried yielding 8 g (86%) of the intermediate 1-methyl-2-oxo-4-thiono-1,2,3,4,6,7-hexahydro-5H-cyclopenta[d]pyrimidine (m.p. 245–250° C., Lit. 245–249° C.)

5.47 g (30 mmol) 1-methyl-2-oxo-4-thiono-1,2,3,4,6,7-hexahydro-5H-cyclopenta[d]pyrimidine was dissolved in 30 mL 1N NaOH. 2.18 mL (5.0 g, 35 mmol) iodomethane was added and the reaction allowed to continue for 30 minutes at room temperature during which the iodomethane gradually dissolved. The pH of the reaction mixture was adjusted to pH=7 with 2N HCl and then extracted 3 times with 50 mL chloroform. The collected chloroform fractions were washed with water, dried over $MgSO_4$ and evaporated under reduced pressure. The residue was treated with 40 mL diethylether/hexane (1:1) and 5.16 g (88%) of the intermediate 1-methyl-4-methylthio-2-oxo-1,2,6,7-tetrahydro-5H-cyclopenta[d]pyrimidine was obtained after filtration and drying (m.p. 139–140° C., Lit. 141–142° C.).

7.54 g (38.5 mmol) of 1-methyl-4-methylthio-2-oxo-1,2,6,7-tetrahydro-5H-cyclopenta[d]pyrimidine was refluxed for 2 hours in 200 mL 2N HCl. After cooling to room temperature, 1-methyl-2,4-dioxo-1,2,3,4,6,7-hexahydro-5H-cyclopenta[d]pyrimidine precipitated from the medium, was filtered off, washed with water and dried to yield 3.13 g (49%) of 1-methyl-2,4-dioxo-1,2,3,4,6,7-hexahydro-5H-cyclopenta[d]pyrimidine (m.p. 250–251° C., Lit. 248–249° C.).

SYNTHESIS EXAMPLE 7

Synthesis of 1,5,6-trimethyluracil (TA-9)

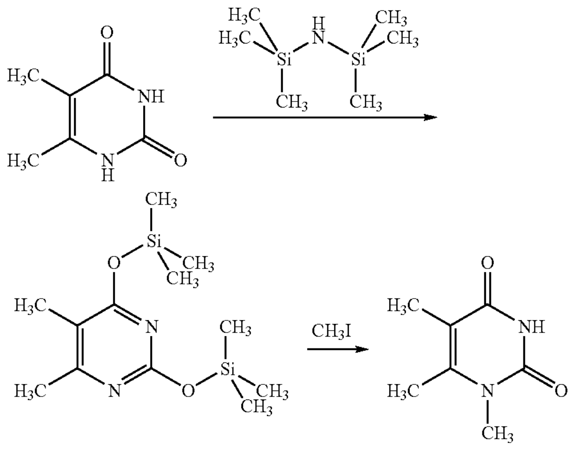

6.00 g (42.9 mmol) 5,6-dimethyluracil was dissolved in 26 mL of hexamethyldisilazane and 2.1 mL DMF. The mixture was heated for 11 hours at 150° C. and the excess of hexamethyldisilazane was removed under reduced pressure. Toluene was added to the mixture and evaporated off under reduced pressure to remove any residual hexamethyldisilazane. The residue was dissolved in 25 mL of iodomethane, refluxed for 2 hours, the excess iodomethane then evaporated off under reduced pressure and the residue recrystallized from deionised water yielding after drying 5.76 g (87%) of 1,5,6-trimethyluracil (m.p. 254–257° C., lit. 256–258° C.).

SYNTHESIS EXAMPLE 8

Synthesis of 3-methyl-8-aza-9H-xanthine (TA-13)

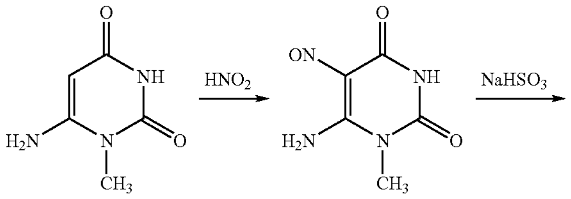

-continued

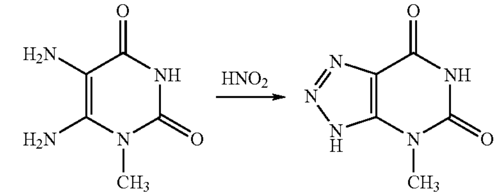

2.12 g (15 mmol) 6-amino-1-methyluracil was suspended in 30 mL 1N HCl and a solution of 1.38 g $NaNO_2$ in 10 mL water added over 10 minutes. After 1 hour at room temperature, the pH was adjusted to 5 with a concentrated ammonia solution and the purple nitroso-intermediate precipitated from the medium. After filtering off, washing with water and drying 2.42 g (92%) of the intermediate 6-amino-1-methyl-5-nitrosouracil was obtained.

To a suspension of 2.42 g (14.3 mmol) of the 6-amino-1-methyl-5-nitrosouracil in water heated to 90° C., was added 30 mL of a 38% solution of $NaHSO_3$ over 10 minutes and the reaction allowed to continue until the reaction mixture was completely decolourized. After cooling the reaction mixture to 0° C., 5,6-diamino-1-methyluracil crystallized from the medium. After filtering off, washing with water, ethanol and diethylether and drying 2.14 g (80%) of the intermediate 5,6-diamino-1-methyluracil was isolated. 8.71 g (55.8 mmol) of 5,6-diamino-1-methyluracil was dissolved in 100 mL water and 50 mL acetic acid upon heating. After cooling to room temperature, a solution of 3.86 g (55.9 mmol) $NaNO_2$ in 17 mL water was added over 5 minutes. The mixture was stirred for 5 minutes and then refluxed for a short time. After standing for two days at room temperature, 3-methyl-8-aza-9H-xanthine crystallized from the mixture. After filtering off, drying, recrystallization from water/ethanol 1:1 and drying 3.57 g (38%) of 3-methyl-8-aza-9H-xanthine was obtained (m.p. 313–320° C.).

SYNTHESIS EXAMPLE 9

Synthesis of 1-isobutyl-1H-pteridine-2,4-dione (TA-15)

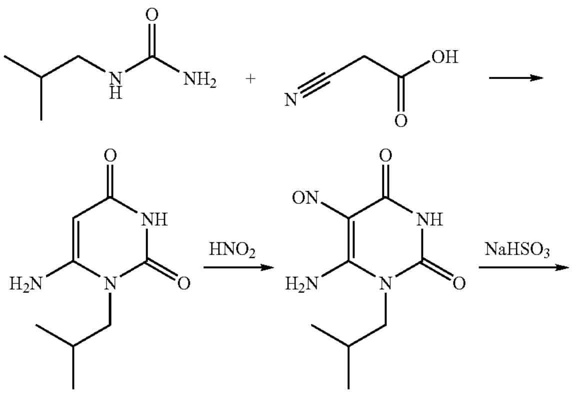

-continued

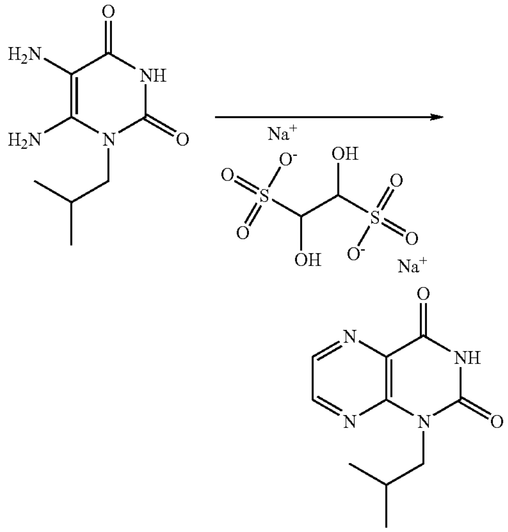

15.8 g (0.136 mol) isobutylurea (prepared from potassium cyanate and isobutylamine by refluxing the mixture at pH 4 to 5 for 1 hour) and 12.7 g (0.149 mol) cyanoacetic acid were dissolved in 39 mL acetic anhydride and heated to 80° C. for 2 hours. After cooling the mixture was treated with 70 mL diethylether, then cooled to 0° C. whereupon 1-cyanoacetyl-3-isobutylurea precipitates out. After filtering off, ashing with diethylether and drying, 16.23 g (0.089 mol) of 1-cyanoacetyl-3-isobutylurea was suspended in 40 mL water and 20 mL ethanol and the mixture heated to 85° C. 10.5 mL of a 10%-NaOH solution was then added dropwise and the reaction allowed to continue for 45 minutes at 85° C., keeping the reaction mixture slightly alkaline. After cooling to room temperature, the reaction mixture was acidified with a 2N HCl-solution and the mixture then further cooled to 0° C. whereupon 6-amino-1-isobutyluracil precipitates out. After filtering off, washing with water and drying 6.46 g (26%) of the intermediate 6-amino-1-isobutyluracil was obtained (m.p. 269–272° C., Lit. 271–272° C.).

15.0 g (81.9 mmol) of 6-amino-1-isobutyluracil was suspended in 165 mL 1N HCl and a solution of 7.54 g (109 mmol) $NaNO_2$ in 55 mL water then added over 10 minutes. After 1 hour at room temperature, the pH was adjusted to 5 with a concentrated ammonia solution, whereupon the purple nitroso-compound precipitated from the medium. After filtering off, washing with water and drying 14.1 g (81%) of the intermediate 6-amino-1-isobutyl-5-nitrosouracil was obtained (m.p. 238–242° C., Lit. 235–236° C.).

After suspending 19.4 (91.5 mmol) 6-amino-1-isobutyl-5-nitrosouracil in 195 mL water and heating the mixture heated 90° C., 214 mL of a 38% solution of $NaHSO_3$ was added dropwise and the reaction is allowed to continue until the mixture was completely decolourized. The reaction mixture was then concentrated to one fifth of its volume, whereupon 5,6-diamino-1-isobutyluracil crystallized out from the medium. After filtering, washing with water and drying 15.4 g (85%) of the intermediate 5,6-diamino-1-isobutyluracil was obtained.

After dissolving 19.8 g (100 mmol) 5,6-diamino-1-isobutyluracil in 1 liter of 1N HCl at 70° C., 186.3 g of glyoxal sodium bisulfite addition compound hydrate was added and the mixture refluxed for 1 hour. After extracting the mixture several times with ethyl acetate, the collected ethyl acetate fractions were washed with water, dried over $MgSO_4$ and evaporated. The crude product was purified by preparative column chromatography using chloroform/methanol 9:1 as eluant yielding 4.25 g (18%) of 1-isobutyl-1H-pteridine-2,4-dione (m.p. 200–201° C., Lit. 195–197° C.).

SYNTHESIS EXAMPLE 10

Synthesis of 1-methylpyrido[2,3-d]pyrimidine-2,4(1H,3H)-dione (TA-14)

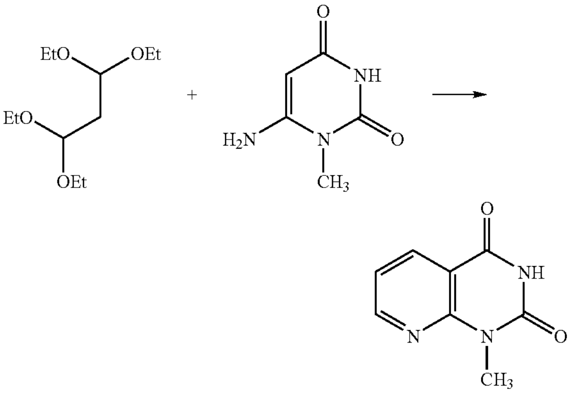

14.34 g (101.7 mmol) 6-amino-1-methyluracil and 26 mL (108 mmol) 1,1,3,3-tetraethoxypropane are dissolved in a mixture of 250 mL ethanol and 1 liter water and refluxed for 3 hours. After cooling down to room temperature, the precipitated intermediate is isolated by filtration washed with water and dried. 7.71 g of the condensation product of the acetal and the amino group is added to 12.5 mL concentrated sulfuric acid and the mixture is heated to 160° C. After cooling down to room temperature, the mixture is poured into 125 g ice. The crude product precipitates from the medium, is isolated by filtration, washed to neutral pH and dried. 4.84 g of the crude product is dissolved in 2 l refluxing methanol. 300 mL silicagel is added and the mixture is evaporated under reduced pressure. The crude product loaded onto the silicagel is purified by preparative column chromatography using chloroform/methanol 9:1. 3.49 g (19%) 1-methylpyrido[2,3-d]pyrimidine-2,4(1H,3H)-dione is isolated (m.p. 277–285° C., Lit. 285° C.).

APPLICATION EXAMPLES

Subbing layer Nr. 01 on the emulsion side of the support had the composition:

| | |
|---|---|
| copolymer of 88% vinylidene chloride, 10% methyl acrylate and 2% itaconic acid | 79.1 mg/$m^2$ |
| Kieselsol ® 100 F, a colloidal silica from BAYER | 18.6 mg/$m^2$ |
| Mersolat ® H, a surfactant from BAYER | 0.4 mg/$m^2$ |
| Ultravon ® W, a surfactant from CIBA-GEIGY | 1.9 mg/$m^2$ |

Ingredients in the thermosensitive element in addition to the above-mentioned ingredients:

BL5HP=S-LEC BL5HP, a polyvinyl butyral from SEKISUI;

Oil=BAYSILON, a silicone oil from BAYER;

VL=DESMODUR VL, a 4,4'-diisocyanatodiphenylmethane from BAYER;

Reducing Agents:

R01=3,4-dihydroxybenzonitrile;

R02=3,4-dihydroxybenzophenone;

Stabilizers:

S01=glutaric acid

S02=tetrachlorophthalic acid anhydride

S03=benzotriazole

COMP-1

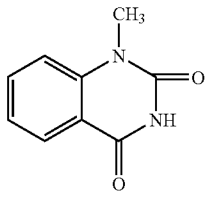

COMP-2

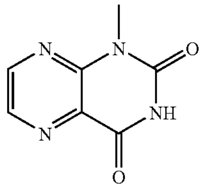

COMP-3

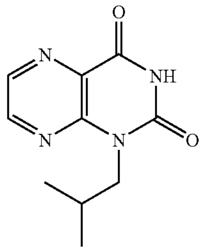

Ingredients in the protective layer:

| | |
|---|---|
| ERCOL ™ 48 20 = | a polyvinylalcohol from ACETEX EUROPE; |
| LEVASIL ™ VP AC 4055 = | a 15% aqueous dispersion of colloidal silica with acid groups predominantly neutralized with sodium ions and a specific surface are of 500 $m^2/g$, from BAYER AG has been converted into the ammonium salt; |
| ULTRAVON ™ W = | 75–85% concentrate of a sodium arylsulfonate from Ciba Geigy converted into acid form by passing through an ion exchange column; |
| SYLOID ™ 72 = | a silica from Grace; |
| SERVOXYL ™ VPDZ 3/100 = | a mono [isotridecyl polyglycolether (3 EO)] phosphate, from SERVO DELDEN B.V.; |
| SERVOXYL ™ VPAZ 100 = | a mixture of monolauryl and dilauryl phosphate, from SERVO DELDEN B.V.; |
| MICROACE TALC P3 = | an Indian talc from NIPPON TALC; |
| RILANIT ™ GMS = | a glycerine monotallow acid ester, from HENKEL AG |
| TMOS = | tetramethylorthosilicate hydrolyzed in the presence of methanesulfonic acid. |

COMPARATIVE EXAMPLES 1 TO 5 AND INVENTION EXAMPLE 1

Influence on Aggregation of Silver Nano-particles of TA-1

A screening method was developed using a silver hydrosol, which was prepared 20 to 30 minutes before the compound TA-1 was screened. 1 mL of a 0.001M solution of the compound being screened was then added to 10 mL of this yellow silver hydrosol. If the silver hydrosol changed colour within one hour, 10 mL of a 0.5% aqueous gelatin solution was added 10 s after this change of colour to prevent further silver aggregation. If no change in colour was observed after 1 hour, the concentration of the compound being screened in the hydrosol was increased from $10^{-4}$M to $10^{-3}$M. Control experiments were carried out with each batch of silver hydrosol to check its performance with a $10^{-3}$M solution of BOD06, a compound giving immediate aggregation.

It is well known that the absorption of silver nano-particles shifts upon aggregation to ever longer wavelengths with ever increasing aggregate size. This shift is perceived as a change in colour from a very pale yellow colour for 10 nm silver particles to orange to red to purple to blue. The degree of aggregation was therefore assessed visually on a scale of 6 levels ranging from ++++ to ––, according to the following criteria:

| | | |
|---|---|---|
| Degree of aggregation of ++++ | = | Strong dark purple-blue colour |
| Degree of aggregation of +++ | = | Dark red to purple colour |
| Degree of aggregation of ++ | = | Red colour |
| Degree of aggregation of + | = | Orange-red colour |
| Degree of aggregation of – | = | Weak orange colour |
| Degree of aggregation of –– | = | No colour change |

The degrees of aggregation obtained with TA-1 is given in Table 1A below and the degrees of aggregation for BOD01 to BOD05 are given in Table 1B below.

Diffusion Performance of TA-1

The diffusion experiments were carried out with the surface of a 15 $g/m^2$ layer of S-LEC BL5HP containing the compound being screened in a concentration of 15 mol % with respect to a quantity of silver behenate a quarter of that of the S-LEC BL5HP coverage coated on a glass support in contact with the surface of a 10 $g/m^2$ layer of S-LEC BL5HP containing glutaric acid in a concentration of 24 mol % with respect to a quantity of silver behenate a quarter of that of the S-LEC BL5HP coverage coated on a SERS-probe. In this configuration the SERS-probe was uppermost. The diffusion experiment was carried out by heating the S-LEC BL5HP-coated glass support with the glass support in contact with an electrically heated plate at a temperature of 150° C. for a predetermined time. The configuration was then removed from the heated plate and a Raman spectrum was taken by Dilor XY-laser spectroscopy with the 514 nm line of a Coherent Innova 70C argon/krypton mixed gas laser at 12 mW through the glass plate to ascertain whether the ingredient being screened had diffused to the silver nano-particles in the SERS-probe on the basis of its surface-enhanced Raman spectrum due to contact with silver using the so-called “Surface Enhanced Raman Scattering” (SERS)-effect.

The coated glass support and the coated SERS-probe were prepared by coating the glass support and SERS-probe respectively with a 2-butanone solution of S-LEC BL5HP and the ingredient being screened and glutaric acid respectively, drying at room temperature and finally heating the coated glass support and the coated SERS-probe for 10 minutes at 85° C.

The SERS-probe was prepared by adding an aqueous solution of silver nitrate to an aqueous solution of potassium borohydride and stabilizing the 5 to 10 nm silver nuclei by adding polyvinyl alcohol, the final composition being 0.01M in silver nitrate, 0.015M in potassium borohydride and 1% in polyvinyl alcohol. The resulting silver hydrosol was then added to a solution of gelatin containing a hardener, a biocide, an inorganic pigment and a hardening regulator. The resulting mixture was coated to a dry thickness of 100 nm onto glass plates giving a thin, yellow transparent film containing silver nuclei 5 to 10 nm in diameter. The coated glass plate was then immersed in deionised water at 40° C. for 15 minutes and then in a 0.001M aqueous solution of silver nitrate containing 0.5% of gelatin and 0.001M in ascorbic acid, a reducing agent for silver cations, at 25° C. Electroless deposition of silver occurred on the silver nuclei rather than nucleation of new particle, because nucleation requires much more energy than growth of the silver nuclei already present. Finally the layer containing 90 nm silver particles was rinsed with deionised water and dried. These 90 nm silver particles were required for the laser wavelength used in these experiments (514.5 nm). Other silver particle sizes can be obtained, depending upon the composition of the bath, its temperature and the time of immersion.

Reference Raman spectra were obtained by placing a drop of an aqueous solution of the molecules given in Table 1 for the particular INVENTION or COMPARATIVE EXAMPLE onto the SERS-probe and measuring the Raman spectrum by Dilor XY-laser spectroscopy with the 514 nm line of a Coherent Innova 70C argon/krypton mixed gas laser at 12 mW measured surface-enhanced as a result of the “Surface Enhanced Raman Scattering” (SERS)-effect with silver.

The diffusion result obtained with TA-1 and those for BOD01 to BOD05 are given in Table 1 below.

TABLE 1

| | | aggregation assessment | aggregation time of silver nano-particles [s] | Diffusion time through BL5HP with glutaric acid at 150° C. [s] |
|---|---|---|---|---|
| Invention example nr. | | | | |
| 1 | TA-1 | +++ | 10 | 120 |
| Comparative example nr. | | | | |
| 1 | BOD01 | +++ | 10 | 5 |
| 2 | BOD02 | ++ | 10 | 30 |
| 3 | BOD03 | + | 10 | 30 |
| 4 | BOD04 | + | 10 | 10 |
| 5 | BOD05 | + | 10 | — |

TA-1, according to the present invention, produced a degree of silver particle aggregation of +++ within 10 s and exhibited a diffusion time at 150° C. through S-LEC BL5HP in the presence of glutaric acid of 120 s.

Compounds BOD01 to BOD05 all belong to the prior art and produced degrees of silver particle aggregation between + and +++ within 10 s and exhibited diffusion times at 150° C. through S-LEC BL5HP in the presence of glutaric acid between 5 and 30 s, which results in undesirable rapid diffusion to the surface of thermographic materials.

COMPARATIVE EXAMPLES 6 TO 13 AND INVENTION EXAMPLES 2 TO 6

The substantially light-insensitive thermographic materials of COMPARATIVE EXAMPLES 6 to 13 and INVENTION EXAMPLES 2 to 6 were prepared by coating a dispersion with the following ingredients in 2-butanone onto a 175 μm thick blue-pigmented polyethylene terephalate support with CIELAB a*- and b*-values of −9.5 and −17.9 respectively subbed on the emulsion-coated side with subbing layer 01 giving layers after drying at 85° C. for 3 minutes in a drying cupboard with the compositions given in Table 2 below.

TABLE 2

| | toning agent of present invention | | AgBeh cover | | R01 mol % | R02 mol % | S01 mol % | S02 mol % | S03 mol % | | |
|---|---|---|---|---|---|---|---|---|---|---|---|
| | type | mol % vs AgB | age [g/m$^2$] | BL5HP [g/m$^2$] | vs AgB | vs AgB | vs AgB | vs AgB | vs AgB | VL [g/m$^2$] | Oil [g/m$^2$] |
| Comparative example nr. | | | | | | | | | | | |
| 6 | BOD01 | 15 | 4.15 | 16.6 | 35 | 45 | 24 | 4.91 | 9.84 | 0.19 | 0.037 |
| 7 | BOD02 | 15 | 4.15 | 16.6 | 35 | 45 | 24 | 4.91 | 9.84 | 0.19 | 0.037 |
| 8 | BOD03 | 15 | 4.15 | 16.6 | 35 | 45 | 24 | 4.91 | 9.84 | 0.19 | 0.037 |
| 9 | BOD04 | 15 | 4.15 | 16.6 | 35 | 45 | 24 | 4.91 | 9.84 | 0.19 | 0.037 |
| 10 | BOD01/BOD05 | 5/10 | 4.15 | 16.6 | 35 | 45 | 24 | 4.91 | 9.84 | 0.19 | 0.037 |
| 11 | BOD05 | 15 | 4.15 | 16.6 | 35 | 45 | 24 | 4.91 | 9.84 | 0.19 | 0.037 |
| 12 | — | — | 4.15 | 16.6 | 35 | 45 | 24 | 4.91 | 9.84 | 0.19 | 0.037 |
| 13 | CTA-I-2 | 15 | 4.15 | 16.6 | 35 | 45 | 24 | 4.91 | 9.84 | 0.19 | 0.037 |
| Invention example nr. | | | | | | | | | | | |
| 2 | CTA-I-2/TA-1 | 5/10 | 4.15 | 16.6 | 35 | 45 | 24 | 4.91 | 9.84 | 0.19 | 0.037 |
| 3 | TA-1 | 15 | 4.15 | 16.6 | 35 | 45 | 24 | 4.91 | 9.84 | 0.19 | 0.037 |
| 4 | TA-1/BOD02 | 5/10 | 4.15 | 16.6 | 35 | 45 | 24 | 4.91 | 9.84 | 0.19 | 0.037 |
| 5 | TA-1/BOD03 | 10/5 | 4.15 | 16.6 | 35 | 45 | 24 | 4.91 | 9.84 | 0.19 | 0.037 |
| 6 | TA-1/BOD04 | 10/5 | 4.15 | 16.6 | 35 | 45 | 24 | 4.91 | 9.84 | 0.19 | 0.037 |

The thermosensitive elements were then coated with an aqueous composition with the following ingredients, which was adjusted to a pH of 3.8 with 1N nitric acid, to a wet layer thickness of 85 μm and then dried at 50° C. for 15 minutes to produce a protective layer with the composition:

| | |
|---|---|
| ERCOL ™ 48 20 = | 2.1 $g/m^2$ |
| LEVASIL ™ VP AC 4055 = | 1.05 $g/m^2$ |
| ULTRAVON ™ W = | 0.075 $g/m^2$ |
| SYLOID ™ 72 = | 0.09 $g/m^2$ |
| SERVOXYL ™ VPDZ 3/100 = | 0.075 $g/m^2$ |
| SERVOXYL ™ VPAZ 100 = | 0.075 $g/m^2$ |
| MICROACE TALC P3 = | 0.045 $g/m^2$ |
| RILANIT ™ GMS = | 0.15 $g/m^2$ |
| TMOS = | 0.87 $g/m^2$ (assuming that the TMOS was completely converted to $SiO_2$) |

After coating the protective layer was hardened by heating the substantially light-insensitive thermographic material at 45° C. for 7 days at a relative humidity of 70%.

Thermographic Printing

The substantially light-insensitive thermographic recording materials of COMPARATIVE EXAMPLES 6 to 13 and INVENTION EXAMPLES 2 to 6 were printed using a DRYSTAR™ 4500 printer from AGFA-GEVAERT with a resolution of 508 dpi which had been modified to operate at a printing speed of 14 mm/s and a line-time of 3.5 ms instead of 7.1 ms and in which the 75 μm long (in the transport direction) and 50 μm wide thermal head resistors were power-modulated to produce different image densities.

Evaluation of Thermographic Properties

The image tone of fresh prints made with the substantially light-insensitive thermographic recording materials of COMPARATIVE EXAMPLES 6 to 13 and INVENTION EXAMPLES 2 to 6 was assessed on the basis of the L*, a* and b* CIELAB-values at optical densities, D, of 1.0 and 2.0 and the results given in Tables 3 to 8.

Assessment of Diffusion of Ingredients and Reaction Products of the Imaging Forming Process to Protective Layer Surface The diffusion of ingredients and reaction products of the imaging forming process to the surface of the protective layer was assessed visually according to a scale of 0 to 5 according to the following criteria:

| | |
|---|---|
| diffusion assessment of 0: | no diffusion |
| diffusion assessment of 1: | first indication of diffusion upon examination under an intense lighting after rubbing with a paper tissue |
| diffusion assessment of 2: | visible in daylight after rubbing with a paper tissue |
| diffusion assessment of 3: | just visible in daylight without rubbing with a paper tissue |
| diffusion assessment of 4: | moderately strong deposition without rubbing with a paper tissue |
| diffusion assessment of 5: | very strong deposition without rubbing with a paper tissue |

The results for printed materials after 3 days at 57° C. and 34% relative humidity are given in Tables 3 to 9 below.

TABLE 3

| | Toning agent | | CIELAB values for fresh prints | | | | assessment of post-printing |
|---|---|---|---|---|---|---|---|
| | | mol % | for D = 1.0 | | for D = 2.0 | | diffusion after |
| | type | vs AgB | a* | b* | a* | b* | 3d/57° C./34% RH |
| Comparative Example Nr. | | | | | | | |
| 13 | CTA-I-2 | 15 | +10.16 | −0.38 | +11.60 | +0.70 | 5 |
| Invention Example Nr. | | | | | | | |
| 2 | CTA-I-2/TA-1 | 5/10 | +4.94 | −3.5 | +8.61 | −2.98 | 3 |
| 3 | TA-1 | 15 | +7.71 | −2.64 | +11.93 | −0.01 | 5 |

The results in Table 3 show that a combination of two toning agents, according to the present invention, CTA-I-2 and TA-1 surprisingly resulted in a* and b* CIELAB values which are more negative than would be expected by combining the properties of the two toning agents indicating an unexpected synergetic effect.

TABLE 4

| | Toning agent | | CIELAB values for fresh prints | | | | assessment of post-printing |
|---|---|---|---|---|---|---|---|
| | | mol % | for D = 1.0 | | for D = 2.0 | | diffusion after |
| | type | vs AgB | a* | b* | a* | b* | 3d/57° C./34% RH |
| Invention Example Nr. | | | | | | | |
| 3 | TA-1 | 15 | +7.71 | −2.64 | +11.93 | −0.01 | 5 |
| 4 | TA-1/BOD02 | 5/10 | −1.37 | −8.42 | +1.99 | −5.03 | 4 |
| Comparative Example nr. | | | | | | | |
| 7 | BOD02 | 15 | +0.99 | −7.90 | +2.67 | −5.25 | 5 |

The results in Tables 3 and 4 show that two combinations of a toning agent, according to the present invention, TA-1 and CTA-I-2 respectively with a benzoxazine dione toning agent, BOD02, also suprisingly resulted in a* and b* CIELAB values which are more negative than would be expected by combining the properties of the two toning agents indicating an unexpected synergetic effect.

TABLE 5

| | Toning agent | | CIELAB values for fresh prints | | | |
|---|---|---|---|---|---|---|
| | | mol % | for D = 1.0 | | for D = 2.0 | |
| | type | vs AgB | a* | b* | a* | b* |
| Invention Example Nr. | | | | | | |
| 3 | TA-1 | 15 | +7.71 | −2.64 | +11.93 | −0.01 |
| 5 | TA-1/BOD03 | 10/5 | −1.77 | −7.6 | +1.08 | −3.85 |
| Comparative Example nr. | | | | | | |
| 8 | BOD03 | 15 | −1.89 | −6.95 | −1.64 | −3.96 |

The results in Table 5 also show that a combination of a toning agent, according to the present invention, TA-1, with a different benzoxazine dione toning agent, BOD03, also surprisingly resulted in a* and b* CIELAB values which are more negative than would be expected by combining the properties of the two toning agents indicating an unexpected synergetic effect.

TABLE 6

| | Toning agent | | CIELAB values for fresh prints | | | |
|---|---|---|---|---|---|---|
| | | mol % | for D = 1.0 | | for D = 2.0 | |
| | type | vs AgB | a* | b* | a* | b* |
| Invention Example Nr. | | | | | | |
| 3 | TA-1 | 15 | +7.71 | −2.64 | +11.93 | −0.01 |
| 6 | TA-1/BOD04 | 10/5 | −1.54 | −6.53 | +1.61 | −2.62 |
| Comparative Example nr. | | | | | | |
| 9 | BOD04 | 15 | −4.37 | −5.24 | −2.52 | −3.10 |

The results in Table 6 also show that a combination of a toning agent, according to the present invention, TA-1, with a different benzoxazine dione toning agent, BOD04, also surprisingly resulted in a* and b* CIELAB values which are more negative than would be expected by combining the properties of the two toning agents indicating an unexpected synergetic effect.

TABLE 7

| Compara-tive | Toning agent | | CIELAB values for fresh prints | | | | assessment of post-printing |
|---|---|---|---|---|---|---|---|
| Example | | mol % | for D = 1.0 | | for D = 2.0 | | diffusion after |
| Nr. | type | vs AgB | a* | b* | a* | b* | 3d/57° C./34% RH |
| 6 | BOD01 | 15 | −3.63 | −8.75 | −2.41 | −5.73 | 5 |
| 10 | BOD01/BOD05 | 5/10 | −3.74 | −6.39 | −1.25 | −4.37 | 5 |
| 11 | BOD05 | 15 | −3.67 | −7.48 | −1.66 | −5.24 | 5 |

The results in Table 7 show that a combinations of two benzoxazine dione toning agents does not exhibit the synergetic more negative a* and b* CIELAB values or the synergetic reduction in diffusion exhibited by a combination of a toning agent, according to the present invention, and a benzoxazine dione toning agent.

TABLE 8

| | Toning agent | | a* CIELAB-values for fresh prints | |
|---|---|---|---|---|
| | type | mol % vs AgB | for D = 1.0 | for D = 2.0 |
| Invention Example Nr. | | | | |
| 3 | TA-1 | 15 | +7.71 | +11.93 |
| Comparative Example nr. | | | | |
| 12 | — | — | +11.71 | +14.81 |

The results in Table 8 show that toning agents, according to the present invention, exhibit in a particular thermosensitive element a marginally more neutral a* CIELAB-value. However, the a* CIELAB-value observed is strongly dependent upon the ingredients used in the substantially light-insensitive thermographic material, which means that with other ingredients a similar difference in a* CIELAB-value would mean the difference between tone neutrality i.e. an a* CIELAB value in the neighbourhood of 0 and a strongly reddish image tone i.e. a strongly positive a* CIELAB-value.

COMPARATIVE EXAMPLES 14 TO 18 AND INVENTION EXAMPLES 7 TO 20

The substantially light-insensitive thermographic materials of COMPARATIVE EXAMPLES 14 to 18 and INVENTION EXAMPLES 7 to 20 were prepared by coating a dispersion with the following ingredients in 2-butanone onto a 175 μm thick blue-pigmented polyethylene terephthalate support with CIELAB a*- and b*-values of −9.5 and −17.9 respectively subbed on the emulsion-coated side with subbing layer 01 giving layers after drying at 85° C. for 3 minutes in a drying cupboard with the compositions given in Table 9 below.

TABLE 9

| | toning agent of present invention | | AgBeh cover | | R01 mol % | R02 mol % | S01 mol % | S02 mol % | S03 mol % | | |
|---|---|---|---|---|---|---|---|---|---|---|---|
| | type | mol % vs AgB | age [g/m$^2$] | BL5HP [g/m$^2$] | vs AgB | vs AgB | vs AgB | vs AgB | vs AgB | VL [g/m$^2$] | Oil [g/m$^2$] |
| Comparative example nr. | | | | | | | | | | | |
| 14 | COMP-1 | 15 | 4.15 | 16.6 | 35 | 45 | 24 | 4.91 | 9.84 | 0.19 | 0.037 |
| 15 | COMP-2 | 15 | 4.15 | 16.6 | 35 | 45 | 24 | 4.91 | 9.84 | 0.19 | 0.037 |
| 16 | COMP-3 | 15 | 4.15 | 16.6 | 35 | 45 | 24 | 4.91 | 9.84 | 0.19 | 0.037 |
| 17 | BOD08 | 15 | 4.15 | 16.6 | 35 | 45 | 24 | 4.91 | 9.84 | 0.19 | 0.037 |
| 18 | — | — | 4.15 | 16.6 | 35 | 45 | 24 | 4.91 | 9.84 | 0.19 | 0.037 |
| Invention example nr. | | | | | | | | | | | |
| 7 | TA-1 | 15 | 4.15 | 16.6 | 35 | 45 | 24 | 4.91 | 9.84 | 0.19 | 0.037 |
| 8 | TA-3 | 15 | 4.15 | 16.6 | 35 | 45 | 24 | 4.91 | 9.84 | 0.19 | 0.037 |
| 9 | TA-4 | 15 | 4.15 | 16.6 | 35 | 45 | 24 | 4.91 | 9.84 | 0.19 | 0.037 |
| 10 | TA-5 | 15 | 4.15 | 16.6 | 35 | 45 | 24 | 4.91 | 9.84 | 0.19 | 0.037 |
| 11 | TA-6 | 15 | 4.15 | 16.6 | 35 | 45 | 24 | 4.91 | 9.84 | 0.19 | 0.037 |
| 12 | TA-7 | 15 | 4.15 | 16.6 | 35 | 45 | 24 | 4.91 | 9.84 | 0.19 | 0.037 |
| 13 | TA-8 | 15 | 4.15 | 16.6 | 35 | 45 | 24 | 4.91 | 9.84 | 0.19 | 0.037 |
| 14 | TA-9 | 15 | 4.15 | 16.6 | 35 | 45 | 24 | 4.91 | 9.84 | 0.19 | 0.037 |
| 15 | TA-10 | 15 | 4.15 | 16.6 | 35 | 45 | 24 | 4.91 | 9.84 | 0.19 | 0.037 |
| 16 | TA-11 | 15 | 4.15 | 16.6 | 35 | 45 | 24 | 4.91 | 9.84 | 0.19 | 0.037 |
| 17 | TA-12 | 15 | 4.15 | 16.6 | 35 | 45 | 24 | 4.91 | 9.84 | 0.19 | 0.037 |
| 18 | TA-15 | 15 | 4.15 | 16.6 | 35 | 45 | 24 | 4.91 | 9.84 | 0.19 | 0.037 |
| 19 | TA-16 | 15 | 4.15 | 16.6 | 35 | 45 | 24 | 4.91 | 9.84 | 0.19 | 0.037 |
| 20 | TA-16/BOD08 | 2/13 | 4.15 | 16.6 | 35 | 45 | 24 | 4.91 | 9.84 | 0.19 | 0.037 |

The thermosensitive elements were then coated with an aqueous composition with the following ingredients, which was adjusted to a pH of 3.8 with 1N nitric acid, to a wet layer thickness of 85 μm and then dried at 50° C. for 15 minutes to produce a protective layer with the composition:

| | |
|---|---|
| ERCOL ™ 48 20 = | 2.1 g/m$^2$ |
| LEVASIL ™ VP AC 4055 = | 1.05 g/m$^2$ |
| ULTRAVON ™ W = | 0.075 g/m$^2$ |
| SYLOID ™ 72 = | 0.09 g/m$^2$ |
| SERVOXYL ™ VPDZ 3/100 = | 0.075 g/m$^2$ |
| SERVOXYL ™ VPAZ 100 = | 0.075 g/m$^2$ |

-continued

| | |
|---|---|
| MICROACE TALC P3 = | 0.045 $g/m^2$ |
| RILANIT ™ GMS = | 0.15 $g/m^2$ |
| TMOS = | 0.87 $g/m^2$ (assuming that the TMOS was completely converted to $SiO_2$) |

After coating the protective layer was hardened by heating the subtantially light-insensitive thermographic material at 45° C. for 7 days at a relative humidity of 70%.

Evaluation

Prints were produced with the thermographic recording materials of COMPARATIVE EXAMPLES 14 to 18 and INVENTION EXAMPLES 7 to 20 as described for the thermographic recording materials of COMPARATIVE EXAMPLE 6 to 13 and INVENTION EXAMPLES 2 to 6 and the image tone of fresh prints assessed as for the thermographic recording materials of COMPARATIVE EXAMPLE 6 to 13 and INVENTION EXAMPLES 2 to 6. The results are given in Tables 10 and 11.

TABLE 10

| | Toning agent | | CIELAB values for fresh prints | | | |
|---|---|---|---|---|---|---|
| | | mol % | for D = 1.0 | | for D = 2.0 | |
| | type | vs AgB | a* | b* | a* | b* |
| Comparative Example Nr. | | | | | | |
| 14 | COMP-1 | 15 | +12.38 | +0.65 | +14.42 | +0.29 |
| 15 | COMP-2 | 15 | +3.60 | −1.70 | +4.56 | −1.47 |
| 16 | COMP-3 | 15 | +17.36 | +4.15 | +20.62 | +3.98 |
| 18 | — | — | +10.91 | −0.73 | +15.93 | +0.11 |
| Invention Example nr. | | | | | | |
| 7 | TA-1 | 15 | +6.31 | −4.11 | +8.13 | −1.09 |
| 8 | TA-3 | 15 | +4.53 | −5.87 | +9.36 | −4.84 |
| 9 | TA-4 | 15 | +4.73 | −6.48 | +7.12 | −5.64 |
| 10 | TA-5 | 15 | +7.52 | −5.55 | +10.06 | −4.93 |
| 11 | TA-6 | 15 | −0.77 | −9.18 | +1.51 | −6.94 |
| 12 | TA-7 | 15 | +3.76 | −8.36 | +4.61 | −5.64 |
| 13 | TA-8 | 15 | +6.05 | −7.51 | +7.85 | −5.07 |
| 14 | TA-9 | 15 | +3.79 | −9.04 | +6.88 | −7.22 |
| 15 | TA-10 | 15 | +4.25 | −6.65 | +6.54 | −5.81 |
| 16 | TA-11 | 15 | +9.51 | −5.38 | +13.34 | −3.24 |
| 17 | TA-12 | 15 | +4.96 | −9.42 | +8.92 | −6.60 |
| 18 | TA-15 | 15 | +6.67 | −6.34 | +9.84 | −4.80 |
| 19 | TA-16 | 15 | +2.41 | −6.77 | +4.10 | −5.81 |

The CIELAB b*-values for a density of 1.0, which is that density which is most determinant in the visual perception of the viewer, were all yellower, as indicated by more negative values, for the thermographic recording materials of COMPARATIVE EXAMPLES 14 to 16 and 18 than for those for the thermographic recording materials of INVENTION EXAMPLES 7 to 19. In other words the image tones for the thermographic recording materials of INVENTION EXAMPLES 7 to 19 were all more blue and hence more acceptable for a radiologist viewing images in transmission than those of the thermographic recording materials of COMPARATIVE EXAMPLES 14 to 16 and 18. This demonstrates that toning agents TA-1, TA-3 to TA-12, TA 15 and TA-16 exhibit more favourable image toning properties as indicated by the less positive a*- and b*-values of the corresponding thermographic recording materials compared with those of the thermographic recording material of COMPARATIVE EXAMPLE 17 which does not contain a toning agent. This also demonstrates the superior image toning properties of toning agents TA-1, TA-3 to TA-12, TA-15 and TA-16 over COMP-1 to COMP-3, toning agents outside the scope of the present invention, as indicated by the less negative b*-values at a density of 1.0 of the corresponding thermographic recording materials, compared with the thermographic recording material of COMPARATIVE EXAMPLES 14 to 16 using COMP-1 to COMP-3.

TABLE 11

| | Toning agent | | CIELAB values for fresh prints | | | |
|---|---|---|---|---|---|---|
| | | mol % | for D = 1.0 | | for D = 2.0 | |
| | type | vs AgB | a* | b* | a* | b* |
| Comparative Example Nr. | | | | | | |
| 17 | BOD08 | 15 | −0.91 | −8.44 | +1.27 | −6.02 |
| Invention Example nr. | | | | | | |
| 19 | TA-16 | 15 | +2.41 | −6.77 | +4.10 | −5.81 |
| 20 | TA-16/BOD08 | 2/13 | −1.70 | −9.21 | +0.50 | −6.68 |

The results in Table 11 show that a combination of a toning agent according to the present invention, TA-16, with a benzoxazine dione toning agent, BOD08, surprisingly resulted in a reduction in both a* and b* CIELAB values compared with the values that would be expected by combining the properties of the two toning agents indicating an unexpected synergetic effect.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A black and white monosheet thermographic recording material comprising a support and a thermosensitive element the thermosensitive element comprising a substantially light-insensitive organic silver salt, an organic reducing agent therefor in thermal working relationship therewith, a binder and at least one toning agent, wherein the at least one toning agent is represented by formula (I):

(I)

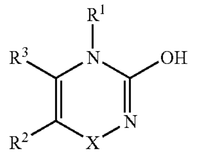

wherein $R^1$ is an alkyl, an alkenyl, an alkynyl, a cycloalkyl, an alkaryl, an aryl, a non-aromatic heterocyclic or a heteroaryl group all of which may be optionally substituted; $R^2$ and $R^3$ are independently a hydrogen or a halogen atom or an amino, amide, ester, carboxy, carbonato, alkyl, alkenyl, alkynyl, cycloalkyl, alkaryl, aryl, non-aromatic heterocyclic or heteroaryl group all of which may be optionally substituted; $R^2$ and $R^3$ may together represent the atoms necessary to complete a heteroaromatic ring with no more than one nitrogen atom, an alicyclic ring or a non-aromatic heterocyclic ring which all may be optionally substituted; X is a carbonyl group, or is —N—$R^5$, where $R^5$ is an alkyl group; and with the proviso that $R^1$ may not be a hydrogen atom if both $R^2$ and $R^3$ are both hydrogen atoms, and wherein said thermographic recording material is a substantially light-insensitive thermographic recording material.

2. The thermographic recording material according to claim 1, wherein the toning agent represented by formula (I) is represented by formula (II):

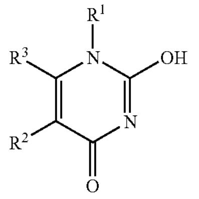

wherein $R^1$ is an alkyl, an alkenyl, an alkynyl, a cycloalkyl, an alkaryl, an aryl, a non-aromatic heterocyclic or a heteroaryl group all of which may be optionally substituted; $R^2$ and $R^3$ are independently a hydrogen or a halogen atom or an amino, amide, ester, carboxy, carbonato, alkyl, alkenyl, alkynyl, cycloalkyl, alkaryl, aryl, non-aromatic heterocyclic or heteroaryl group all of which may be optionally substituted; $R^2$ and $R^3$ may together represent the atoms necessary to complete a heteroaromatic ring with no more than one nitrogen atom, an alicyclic ring or a non-aromatic heterocyclic ring which all may be optionally substituted; and with the proviso that $R^1$ may not be a hydrogen atom if both $R^2$ and $R^3$ are both hydrogen atoms.

3. The thermographic recording material according to claim 1, wherein said substituent for $R^1$ is selected from the group consisting of alkyl, aryl, alkoxy, hydroxy, carboxy, ester, amide, sulfo and sulfoalkyl groups.

4. The thermographic recording material according to claim 1, wherein said substituent for $R^2$ is selected from the group consisting of alkyl, aryl, alkoxy, hydroxy, carboxy, ester, amide, sulfo and sulfoalkyl groups.

5. The thermographic recording material according to claim 1, wherein said substituent for $R^3$ is selected from the group consisting of alkyl, aryl, alkoxy, hydroxy, carboxy, ester, amide, sulfo and sulfoalkyl groups.

6. The thermographic recording material according to claim 1, wherein said toning agent represented by formula (I) is selected from the group consisting of

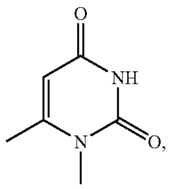

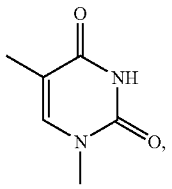

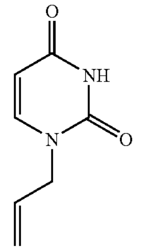

and

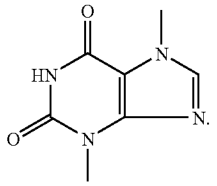

7. The thermographic recording material according to claim 1, wherein said thermosensitive element further comprises at least one toning agent selected from the group consisting of compounds according to formula (III), (III)

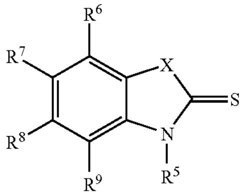

wherein $R^5$ is an alkyl group optionally substituted with a hydroxy, carboxy, carboxy ester, acyl or carbonato group; X is S, O or N—$R^{10}$; $R^6$ is an optionally substituted alkyl group; $R^6$, $R^7$, $R^8$ and $R^9$ independently represent a hydrogen atom, a halogen atom or an alkyl, an alkoxy, a thio-alkoxy, a nitro, a cyano, a carboxy, a carboxy ester, an acyl, an aldehyde, an acylamido, a sulphonamido, an acylamino, a carbonato, a hydroxy or an aryl group or at least one of $R^6$ and $R^7$, $R^7$ and $R^8$ and $R^8$ and $R^9$ independently represent the atoms necessary to form a carbocyclic or heterocyclic group or at least one of $R^5$ and $R^9$ and $R^6$ and $R^{10}$ independently represent the atoms necessary to form a heterocyclic ring; compounds represented by formula (IV):

(IV)

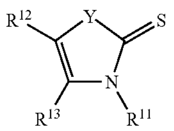

wherein $R^{11}$ is an optionally substituted alkyl group; Y is S, O or N—$R^{14}$; $R^{14}$ is an optionally substituted alkyl group; $R^{12}$ and $R^{13}$ independently represent a hydrogen atom, a halogen atom or an alkyl, an alkoxy, a thio-alkoxy, a nitro, a cyano, a carboxy, a carboxy ester, an acyl, an aldehyde, an acylamido, a sulphonamido, an acylamino, a carbonato, a hydroxy or an aryl group or $R^{12}$ and $R^{13}$ represent the atoms necessary to form a heterocyclic or a non-aromatic carbacyclic ring or at least one of $R^{12}$ and $R^{14}$ and $R^{13}$ and $R^{11}$ independently represent the atoms necessary to form a heterocyclic ring; and both $R^{12}$ and $R^{13}$ cannot both be an alkyl group, phthalazinone, phthalazinone derivatives, pyridazone, pyridazone derivatives, benzoxazine dione, benzoxazine dione derivatives, naphthoxazine dione and naphthoxazine dione derivatives.

8. The thermographic recording material according to claim 7, wherein said at least one benzoxazine dione derivative is selected from the group consisting of benzo[e][1,3]oxazine-2,4-dione, 7-methyl-benzo[e][1,3]oxazine-2,4-dione, 7-methoxy-benzo[e][1,3]oxazine-2,4-dione, 7-butoxy-benzo[e][1,3]oxazine-2,4-dione, 7-(ethylcarbonato)-benzo[e][1,3]oxazine-2,4-dione,

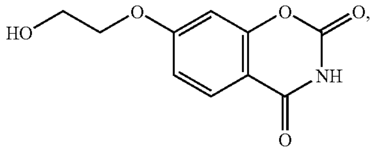

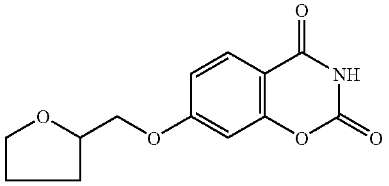

and

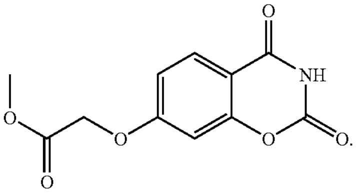

9. A process for providing an image on a monosheet thermographic recording material comprising (a) providing a monosheet thermographic recording material comprising a support and a thermosensitive element, the thermosensitive element comprising a substantially light-insensitive organic silver salt, a reducing agent therefor, a binder and at least one toning agent and (b) imagewise exposing the monosheet thermographic recording material, wherein the at least one toning agent is represented by formula (I):

(I)

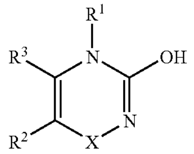

wherein $R^1$ is an alkyl, an alkenyl, an alkynyl, a cycloalkyl, an alkaryl, an aryl, a non-aromatic heterocyclic or a heteroaryl group all of which may be optionally substituted; with the proviso that $R^1$ may not be a hydrogen atom if both $R^2$ and $R^3$ are both hydrogen atoms; $R^2$ and $R^3$ are independently a hydrogen or a halogen atom or an amino, amide, ester, carboxy, carbonato, alkyl, alkenyl, alkynyl, cycloalkyl, alkaryl, aryl, non-aromatic heterocyclic or heteroaryl group all of which may be optionally substituted; $R^2$ and $R^3$ together represent the atoms necessary to complete a heteroaromatic ring with no more than one nitrogen atom, an alicyclic ring or a non-aromatic heterocyclic ring which all may be optionally substituted; and X is a carbonyl group, or is —N—$R^4$, where $R^4$ is an alkyl group.

10. The process according to claim 9, wherein the monosheet thermographic recording material further comprises photosensitive sliver halide and the monosheet thermographic material is a photothermographic material.

11. The process according to claim 9, wherein the monosheet thermographic recording material is a substantially light-insensitive thermographic material.

12. A black and white monosheet thermographic recording material comprising a support and a thermosensitive element the thermosensitive element comprising a substantially light-insensitive organic silver salt, an organic reducing agent therefor in thermal working relationship therewith, photosensitive silver halide, a binder and at least one toning agent, wherein the at least one toning agent is represented by formula (I):

(1)

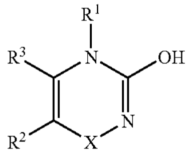

wherein $R^1$ is an alkyl, an alkenyl, an alkynyl, a cycloalkyl, an alkaryl, an aryl, a non-aromatic heterocyclic or a heteroaryl group all of which may be optionally substituted; $R^2$ and $R^3$ are independently a hydrogen or a halogen atom or an amino, amide, ester, carboxy, carbonato, alkyl, alkenyl, alkynyl, cycloalkyl, alkaryl, aryl, non-aromatic heterocyclic or heteroaryl group all of which may be optionally substituted; $R^2$ and $R^3$ may together represent the atoms necessary to complete a heteroaromatic ring with no more than one nitrogen atom, an alicyclic ring or a non-aromatic heterocyclic ring which all may be optionally substituted; X is a carbonyl group, or is —N—$R^5$, where $R^5$ is an alkyl group; and wit the proviso that $R^1$ may not be a hydrogen atom if both $R^2$ and $R^3$ are both hydrogen atoms.

13. The thermographic recording material according to claim 12, wherein the toning agent represented by formula (I) is represented by formula (II):

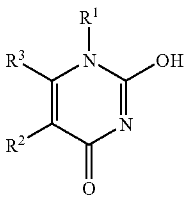

wherein $R^1$ is an alkyl, an alkenyl, an alkynyl, a cycloalkyl, an alkaryl, an aryl, a non-aromatic heterocyclic or a heteroaryl group all of which may be optionally substituted; $R^2$ and $R^3$ are independently a hydrogen or a halogen atom or an amino, amide, ester, carboxy, carbonato, alkyl, alkenyl, alkynyl, cycloalkyl, alkaryl, aryl, non-aromatic heterocyclic or heteroaryl group all of which may be optionally substituted; $R^2$ and $R^3$ may together represent the atoms necessary to complete a heteroaromatic ring with no more than one nitrogen atom, an alicyclic ring or a non-aromatic heterocyclic ring which all may be optionally substituted; and with the proviso that $R^1$ may not be a hydrogen atom if both $R^2$ and $R^3$ are both hydrogen atoms.

14. The thermographic recording material according to claim 12, wherein said substituent for $R^1$ is selected from the group consisting of alkyl, aryl, alkoxy, hydroxy, carboxy, ester, amide, sulfo and sulfoalkyl groups.

15. The thermographic recording material according to claim 12, wherein said substituent for $R^2$ is selected from the group consisting of alkyl, aryl, alkoxy, hydroxy, carboxy, ester, amide, sulfo and sulfoalkyl groups.

16. The thermographic recording material according to claim 12, wherein said substituent for $R^3$ is selected from the group consisting of alkyl, aryl, alkoxy, hydroxy, carboxy, ester, amide, sulfo and sulfoalkyl groups.

17. The thermographic recording material according to claim 12, wherein said toning agent represented by formula (I) is selected from the group consisting of

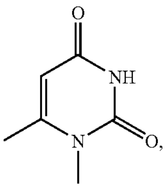

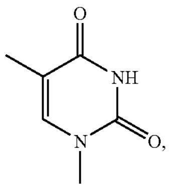

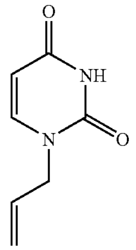

and

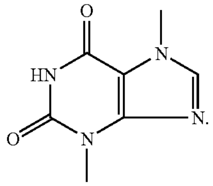

18. The thermographic recording material according to claim 12, wherein said thermosensitive element further comprises at least one toning agent selected from the group consisting of compounds according to formula (III):

(III)

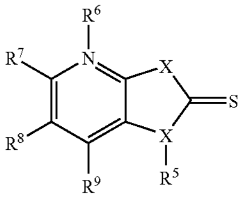

wherein $R^5$ is an alkyl group optionally substituted with a hydroxy, carboxy, carboxy ester, acyl or carbonato group; X is S, O or N—$R^{10}$; $R^6$ an optionally substituted alkyl group; $R^6$, $R^7$, $R^8$ and $R^9$ independently represent a hydrogen atom, a halogen atom or an alkyl, an alkoxy, a thio-alkoxy, a nitro, a cyano, a carboxy, a carboxy ester, an acyl, an aldehyde, an acylamido, a sulphonamido, an acylamino, a carbonato, a hydroxy or an aryl group or at least one of $R^6$ and $R^7$, $R^7$ and $R^8$ and $R^8$ and $R^9$ independently represent the atoms necessary to form a carbocyclic or heterocyclic group or at least one of $K^5$ and $R^9$ and $R^6$ and $R^{10}$ independently represent the atoms necessary to form a heterocyclic ring; compounds represented by formula (IV):

(IV)

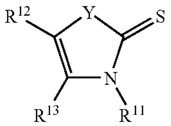

wherein $R^{11}$ is an optionally substituted alkyl group; Y is S, O or N—$R^{14}$; $R^{14}$ is an optionally substituted alkyl group; $R^{12}$ and $R^{13}$ independently represent a hydrogen atom, a halogen atom or an alkyl, an alkoxy, a thio-alkoxy, a nitro, a cyano, a carboxy, a carboxy ester, an acyl, an aldehyde, an acylamido, a sulphonamido, an acylamino, a carbonato, a hydroxy or an aryl group or $R^{12}$ and $R^{13}$ represent the atoms necessary to form a heterocyclic or a non-aromatic carbocyclic ring or at least one of $R^{12}$ and $R^{14}$ and $R^{13}$ and $R^{11}$ independently represent the atoms necessary to form a heterocyclic ring; and both $R^{12}$ and $R^{13}$ cannot both be an alkyl group, phthalazinone, phthalazinone derivatives, pyridazone, pyridazone derivatives, benzoxazine dione, benzoxazine dione derivatives, naphthoxazine dione and naphthoxazine dione derivatives.

19. The thermographic recording material according to claim 18, wherein said at least one benzoxazine dione derivative is selected from the group consisting of benzo[e][1,3]oxazine-2,4-dione, 7-methyl-benzo[e][1,3]oxazine-2,4-dione, 7-methoxy-benzo[e][1,3]oxazine-2,4-dione, 7-butoxy-benzo[e][1,3]oxazine-2,4-dione, 7-(ethylcarbonato)-benzo[e][1,3]oxazine-2,4-dione,

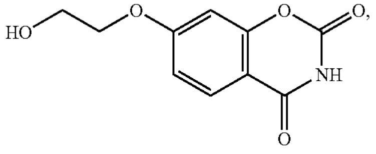

-continued
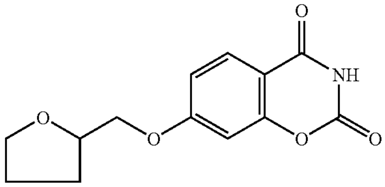
and
-continued
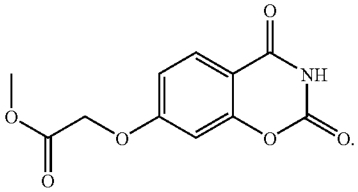
* * * * *